United States Patent
De Foy et al.

(10) Patent No.: US 9,621,537 B2
(45) Date of Patent: *Apr. 11, 2017

(54) METHOD AND APPARATUS FOR ENABLING ACCESS TO APPLICATIONS INTEGRATED WITH A VISITED NETWORK

(71) Applicant: InterDigital Patent Holdings, Inc, Wilmington, DE (US)

(72) Inventors: Xavier De Foy, Kirkland (CA); Kamel M. Shaheen, King of Prussia, PA (US); Milan Patel, Harrow (GB); Osama Lotfallah, San Diego, CA (US); Hang Liu, North Potomac, MD (US); Yousif Targali, Sammamish, WA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,890

(22) Filed: Sep. 23, 2016

(65) Prior Publication Data

US 2017/0012966 A1   Jan. 12, 2017

Related U.S. Application Data

(63) Continuation of application No. 13/630,523, filed on Sep. 28, 2012, now Pat. No. 9,497,627.

(Continued)

(51) Int. Cl.
*H04W 12/06* (2009.01)
*H04W 8/20* (2009.01)
(Continued)

(52) U.S. Cl.
CPC ........ *H04L 63/0815* (2013.01); *H04L 63/102* (2013.01); *H04W 8/04* (2013.01);
(Continued)

(58) Field of Classification Search
CPC . H04L 63/08; H04L 63/0815; H04L 63/0853; H04L 61/1588; H04L 41/0893;
(Continued)

(56) References Cited

U.S. PATENT DOCUMENTS 7,885,640 B2    2/2011  Holtmanns
2007/0050365 A1*  3/2007  Laitinen .................. H04L 63/08
(Continued)

FOREIGN PATENT DOCUMENTS

CN    101022651 A    8/2007
CN    102026296 A    4/2011
(Continued)

OTHER PUBLICATIONS

3G Americas—Identity Management Overview of Standards and Technologies for mobile and fixed internet.*

(Continued)

*Primary Examiner* — Nizar Sivji
(74) *Attorney, Agent, or Firm* — Invention Mine LLC

(57) ABSTRACT

An application server receives a request for service from a wireless transmit/receive unit (WTRU) associated with a home network that includes a home subscriber server (HSS) and a bootstrapping server function (BSF) coupled via a Zh reference point. The application server authenticates the WTRU at least in part by (i) redirecting the WTRU to an identity provider co-located with a network application function (IDP/NAF) and coupled to the BSF via a Zn reference point and (ii) receiving an assertion from the WTRU that the IDP/NAF has authenticated the WTRU based on user security settings retrieved from the BSF by the IDP/NAF over the Zn reference point. After authenticating the WTRU, the application server (i) retrieves user-specific Sh-reference-point-type data from the HSS via the IDP/NAF over the Zn and Zh reference points and (ii) provides the (Continued)

service to the WTRU based on the retrieved user-specific Sh-reference-point-type data.

20 Claims, 23 Drawing Sheets

Related U.S. Application Data

(60) Provisional application No. 61/540,682, filed on Sep. 29, 2011.

(51) Int. Cl.
    H04L 29/06       (2006.01)
    H04W 12/08       (2009.01)
    H04W 8/04        (2009.01)

(52) U.S. Cl.
    CPC ............. H04W 8/20 (2013.01); H04W 12/06 (2013.01); H04W 12/08 (2013.01)

(58) Field of Classification Search
    CPC .. H04L 41/5054; H04L 63/102; H04W 12/06; H04W 8/18; H04W 4/005; H04W 4/001; H04W 8/20
    See application file for complete search history.

(56) References Cited

U.S. PATENT DOCUMENTS

| | | | |
|---|---|---|---|
| 2011/0145583 A1 | 6/2011 | Holtmanns | |
| 2011/0161504 A1 | 6/2011 | Zhou | |
| 2011/0188508 A1* | 8/2011 | Hjelm | ............. G06F 21/33 370/401 |
| 2011/0264913 A1* | 10/2011 | Nikander | ............. H04L 63/0815 713/168 |
| 2012/0204231 A1* | 8/2012 | Holtmanns | ......... H04L 63/0815 726/3 |

FOREIGN PATENT DOCUMENTS

| | | |
|---|---|---|
| EP | 1713204 A1 | 10/2006 |
| EP | 2056570 A1 | 5/2009 |
| WO | 2010125535 A1 | 11/2010 |

OTHER PUBLICATIONS

Third Generation Partnership Project, "Technical Specification Group Core Network and Terminals; Sh Interface based on the Diameter protocol; Protocol details (Release 10)," 3GPP TS 29.329 V10.3.0(Jun. 2011).
Third Generation Partnership Project, "Technical Specification Group Core Network and Terminals; Sh Interface based on the Diameter protocol; Protocol details (Release 10)," 3GPP TS 29.329 V10.4.0 (Dec. 2011).
Third Generation Partnership Project, "Technical Specification Group Core Network and Terminals; Sh Interface based on the Diameter protocol; Protocol details (Release 11)," 3GPP TS 29.329 V11.0.0 (Jun. 2011).
Third Generation Partnership Project, "Technical Specification Group Core Network and Terminals; Sh Interface based on the Diameter protocol; Protocol details (Release 11)," 3GPP TS 29.329 V11.4.0 (Sep. 2012).
Third Generation Partnership Project, "Technical Specification Group Core Network and Terminals; Sh Interface based on the Diameter protocol; Protocol details (Release 5)," 3GPP TS 29.329 V5.11.0 (Sep. 2005).
Third Generation Partnership Project, "Technical Specification Group Core Network and Terminals; Sh. Interface based on the Diameter protocol; Protocol details (Release 6)," 3GPP TS 29:329 V6.7.0 (Sep. 2006.

Third Generation Partnership Project, "Technical Specification Group Core Network and Terminals; Sh Interface based on the Diameter protocol; Protocol details (Release 7)," 3GPP TS 29.329 V7.8.0 (Mar. 2009).
Third Generation Partnership Project, "Technical Specification Group Core Network and Terminals; Sh Interface based on the Diameter protocol; Protocol details (Release 8)," 3GPP TS 29.329 V8.7.0 (Sep. 2010).
Third Generation Partnership Project, "Technical Specification Group Core Network and Terminals; Sh Interface based on the Diameter protocol; Protocol details (Release 8)," 3GPP TS 29.329 V8.9.0 (Dec. 2011).
Third Generation Partnership Project, "Technical Specification Group Core Network and Terminals; Sh Interface based on the Diameter protocol; Protocol details (Release 9)," 3GPP TS 29.329 V9.4.0 (Dec. 2010).
Third Generation Partnership Project, "Technical Specification Group Core Network and Terminals; Sh Interface based on the Diameter protocol; Protocol details (Release 9)," 3GPP TS 29.329 V9.5.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0 (Jun. 2011)
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.3.0 (Sep. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9),"3GPP TS 36.300 V9.9.0 (Dec. 2011).
Third Generation Partnership Project, "Technical Specification Group Services and System Aspects; 3GPP System Architecture Evolution (SAE); Security architecture (Release 10)," 3GPP TS 33.401 V10.1.1 (Jun. 2011).
Third Generation Partnership Project, "Technical Specification Group Services and System Aspects; 3GPP System Architecture Evolution (SAE); Security architecture (Release 10)," 3GPP TS 33.401 V10.3.0(Jun. 2012).
Third Generation Partnership Project, "Technical Specfication Group Services and System Aspects; 3GPP System Architecture Evolution (SAE); Security architecture (Release 11)," 3GPP TS 33.401 V11.0.1 (Jun. 2011).
Third Generation Partnership Project, "Technical Specification Group Services and System Aspects; 3GPP System Architecture Evolution (SAE); Security architecture (Release 8)," 3GPP TS 33.401 V8.8.0 (Jun. 2011).
Third Generation Partnership Project, "Technical Specification Group Services and System Aspects; 3GPP System Architecture Evolution (SAE); Security architecture (Release 9)," 3GPP TS 33.401 V9.7.0 (Jun. 2011).
Third Generation Partnership Project, "Technical Specification Group Services and System Aspects; 3GPP system to Wireless

(56) References Cited

OTHER PUBLICATIONS

Local Area Network (WLAN) interworking; system description (Release 10)," 3GPP TS 23.234 V10.0.0 (Mar. 2011).
Third Generation Partnership Project, "Technical Specification Group Services and System Aspects; 3GPP system to Wireless Local Area Network (WLAN) interworking; System description (Release 11)," 3GPP TS 23.234 V11.0.0 (Sep. 2012).
Third Generation Partnership Project, "Technical Specification Group Services and System Aspects; 3GPP system to Wireless Local Area Network (WLAN) interworking; System description (Release 6)," 3GPP TS 23.234 V6.10.0 (Sep. 2006).
Third Generation Partnership Project, "Technical Specification Group Services and System Aspects; 3GPP system to Wireless Local Area Network (WLAN) interworking; System description (Release 7)," 3GPP TS 23.234 V7.7.0 (Jun. 2008).
Third Generation Partnership Project, "Technical Specification Group Services and System Aspects; 3GPP system to Wireless Local Area Network (WLAN) interworking; System description (Release 8)," 3GPP TS 23.234 V8.0.0 (Dec. 2008).
Third Generation Partnership Project, "Technical Specification Group Services and System Aspects; 3GPP system to Wireless Local Area Network (WLAN) interworking; System description (Release 9)," 3GPP TS 23.234 V9.0.0 (Dec. 2009).
Third Generation Partnership Project, "Technical Specification Group Services and System Aspects; Architecture enhancements for non-3GPP accesses (Release 10)," 3GPP TS 23.402 V10.5.0 (Sep. 2011).
Third Generation Partnership Project, "Technical Specification Group Services and System Aspects; Architecture enhancements for non-3GPP accesses (Release 10)," 3GPP TS 23.402 V10.8.0 (Sep. 2012).
Third Generation Partnership Project, "Technical Specification Group Services and System Aspects; Architecture enhancements for non-3GPP accesses (Release 11)," 3GPP TS 23.402 V11.0.0 (Sep. 2011).
Third Generation Partnership Project, "Technical Specification Group Services and System Aspects; Architecture enhancements for non-3GPP accesses (Release 11)," 3GPP TS 23.402 V11.4.0 (Sep. 2012).
Third Generation Partnership Project, "Technical Specification Group Services and System Aspects; Architecture enhancements for non-3GPP accesses (Release 8)," 3GPP TS 23.402 V8.10.0 (Mar. 2012).
Third Generation Partnership Project, "Technical Specification Group Services and System Aspects; Architecture enhancements for non-3GPP accesses (Release 8)," 3GPP TS 23.402 V8.9.0 (Jun. 2010).
Third Generation Partnership Project, "Technical Specification Group Services and System Aspects; Architecture enhancements for non-3GPP accesses (Release 9)," 3GPP TS 23.402 V9.10.0 (Sep. 2011).
Third Generation Partnership Project, "Technical Specification Group Services and System Aspects; Architecture enhancements for non-3GPP accesses (Release 9)," 3GPP TS 23.402 V9.12.0 (Mar. 2012).
Third Generation Partnership Project, "Technical Specification Group Services and System Aspects; EPC enhancements to Support Interworking with Data Application Providers (MOSAP); Stage 2 (Release 11)," 3GPP TR 23.862 V0.1.0 (Jul. 2011).
Third Generation Partnership Project, "Technical Specification Group Services and System Aspects; EPC enhancements to Support Interworking with Data Application Providers (MOSAP); Stage 2 (Release 12)," 3GPP TR 23.862 VO.2.0 (May 2012).
Third Generation Partnership Project, "Technical Specification Group Services and System Aspects; EPC enhancements to Support Interworking with Data Application Providers (MOSAP); Stage 2 (Release 12)," 3GPP TR 23.862 VO.3.0 (Jul. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.5.0 (Sep. 2011).
Third Generation Partnership Project, "Technical Specification Group Services and System Aspects; General Packet Radio Service (GPRS) enhancements for Evolved Universal Terrestrial Radio Access Network (E-UTRAN) Access (Release 10)," 3GPP TS 23.401 V10.8.0 (Jun. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.3.0 (Sep. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.14.0 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Services and System Aspects; General Packet Radio (GPRS) enhancements for Evolved Universal Terrestrial Radio Access Network (E-UTRAN) access (Release 9)," 3GPP TS 23.401 V9.10.0 (Sep. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.13.0 (Jun. 2012).
Third Generation Partnership Project, "Technical Specification Group Services and System Aspects; Generic Authentication Architecture (GAA); Generic Bootstrapping Architecture (GBA) (Release 10)," 3GPP TS 33.220 V10.0.0 (Oct. 2010).
Third Generation Partnership Project, "Technical Specification Group Services and System Aspects; Generic Authentication Architecture (GAA); Generic Bootstrapping Architecture (GBA) (Release 10)," 3GPP TS 33.220 V10.1.0 (Mar. 2012).
Third Generation Partnership Project, "Technical Specification Group Services and System Aspects; Generic Authentication Architecture (GAA); Generic Bootstrapping Architecture (GBA) (Release 11)," 3GPP TS 33.220 V11.4.0 (Sep. 2012).
Third Generation Partnership Project, "Technical Specification Group Services and System Aspects; Generic Authentication Architecture (GAA); Generic bootstrapping architecture (GBA) (Release 8)," 3GPP TS 33.220 V8.9.0 (Mar. 2012).
Third Generation Partnership Project, "Technical Specification Group Services and System Aspects; Generic Authentication Architecture (GAA); Generic bootstrapping architecture (GBA) (Release 9)," 3GPP TS 33.220 V9.4.0 (Mar. 2012).
Third Generation Partnership Project, "Technical Specification Group Services and System Aspects; Generic Authentication Architecture (GAA); Generic bootstrapping architecture (Release 6)," 3GPP TS 33.220 V6.13.0 (Jun. 2007).
Third Generation Partnership Project, "Technical Specification Group Services and System Aspects; Generic Authentication Architecture (GAa); Generic bootstrapping architecture (Release 7)," 3GPP TS 33.220 V7.11.0 (Mar. 2008).
Third Generation Partnership Project, "Technical Specification Group Services and System Aspects; Generic Authentication Architecture (GAA); Generic bootstrapping architecture (Release 8)," 3GPP TS 33.220 V8.8.0 (Dec. 2009).
Third Generation Partnership Project, "Technical Specification Group Services and System Aspects; Generic Authentication Architecture (GAA); Generic bootstrapping architecture (Release 9)," 3GPP TS 33.220 V9.3.0 (Jun. 2010).
Third Generation Partnership Project, "Technical Specification Group Services and System Aspects; Identity management and 3GPP security interworking; Identity management and Generic

(56) References Cited

OTHER PUBLICATIONS

Authentication Architecture (GAA) interworking (Release 11)," 3GPP TR 33.924 V11.0.0 (Sep. 2012).
Third Generation Partnership Project, "Technical Specification Group Services and System Aspects; Identity management and 3GPP security interworking; Identity management and Generic Authentication Architecture (GAA) interworking (Release 9)," 3GPP TR 33.924 V9.4.0 (Jun. 2011).
Third Generation Partnership Project, "Technical Specification Group Services and System Aspects; IP Multimedia Subsystem (IMS); Stage 2 (Release 10)," 3GPP TS 23.228 V10.6.0 (Sep. 2011).
Third Generation Partnership Project, "Technical Specification Group Services and System Aspects; IP Multimedia Subsystem (IMS); Stage 2 (Release 10)," 3GPP TS 23.228 V10.7.0 (Dec. 2011).
Third Generation Partnership Project, "Technical Specification Group Services and System Aspects; IP Multimedia Subsystem (IMS); Stage 2 (Release 11)," 3GPP TS 23.228 V11.2.0 (Sep. 2011).
Third Generation Partnership Project, "Technical Specification Group Services and System Aspects; IP Multimedia Subsystem (IMS); Stage 2 (Release 11)," 3GPP TS 23.228 V11.6.0 (Sep. 2012).
Third Generation Partnership Project, "Technical Specification Group Services and System Aspects; IP Multimedia Subsystem (IMS); Stage 2 (Release 6)," 3GPP TS 23.228 V6.16.0 (Mar. 2007).
Third Generation Partnership Project, "Technical Specification Group Services and System Aspects; IP Multimedia Subsystem (IMS); Stage 2 (Release 7)," 3GPP TS 23.228 V7.16.0 (Dec. 2009).
Third Generation Partnership Project, "Technical Specification Group Services and System Aspects; IP Multimedia Subsystem (IMS); Stage 2 (Release 8)," 3GPP TS 23.228 V8.12.0 (Mar. 2010).
Third Generation Partnership Project, "Technical Specification Group Services and System Aspects; IP Multimedia Subsystem (IMS); Stage 2 (Release 9)," 3GPP TS 23.228 V9.4.0 (Sep. 2010).
Third Generation Partnership Project, "Technical Specification Group Services and System Aspects; Policy and charging control architecture (Release 10)," 3GPP TS 23.203 V10.4.0 (Jun. 2011).
Third Generation Partnership Project, "Technical Specification Group Services and System Aspects; Policy and charging control architecture (Release 10)," 3GPP TS 23.203 V10.8.0 (Sep. 2012).
Third Generation Partnership Project, "Technical Specification Group Services and System Aspects; Policy and charging control architecture (Release 11)," 3GPP TS 23.203 V11.3.0 (Sep. 2011).
Third Generation Partnership Project, "Technical Specification Group Services and System Aspects; Policy and charging control architecture (Release 11)," 3GPP TS 23.203 V11.7.0 (Sep. 2012).
Third Generation Partnership Project, "Technical Specification Group Services and System Aspects; Policy and charging control architecture (Release 7)," 3GPP TS 23.203 V7.12.0 (Dec. 2009).
Third Generation Partnership Project, "Technical Specification Group Services and System Aspects; Policy and charging control architecture (Release 8)," 3GPP TS 23.203 V8.12.0 (Jun. 2011).
Third Generation Partnership Project, "Technical Specification Group Services and System Aspects; Policy and charging control architecture (Release 8)," 3GPP TS 23.203 V8.14.0 (Jun. 2012).
Third Generation Partnership Project, "Technical Specification Group Services and System Aspects; Policy and charging control architecture (Release 9)," 3GPP TS 23.203 V9.12.0 (Jun. 2012).
Third Generation Partnership Project, "Technical Specification Group Services and System Aspects; Policy and charging control architecture (Release 9)," 3GPP TS 23.203 V9.9.0 (Jun. 2011).
Third Generation Partnership Project, "Technical Specification Group Services and System Aspects; Service requirements for the Evolved Packet System (EPS) (Release 11)," 3GPP TS 22.278 V11.3.0 (Jun. 2012).
Third Generation Partnership Project, "Technical Specification Group Services and System Aspects; Service requirements for the Evolved Packet System (EPS) (Release 11)," 3GPP TS 22.278 V11.6.0 (Sep. 2012).
Third Generation Partnership Project, "Technical Specification Group Services and System Aspects; Service requirements for the Evolved Packet System (EPS) (Release 12)," 3GPP TS 22.278 V12.1.0 (Jun. 2012).
Third Generation Partnership Project, "Technical Specification Group Services and System Aspects; Service requirements for the Evolved Packet System (EPS) (Release 8)," 3GPP TS 22.278 V8.10.0 (Dec. 2009).
Third Generation Partnership Project, "Technical Specification Group Services and System Aspects; Service requirements for the Evolved Packet System (EPS) (Release 9)," 3GPP TS 22.278 V9.6.0 (Sep. 2010).
Third Generation Partnership Project, "Technical Technical Specification Group Core Network and Terminals; Policy and Charging Control (PCC) over S9 reference point; Stage 3 (Release 10)," 3GPP TS 29.215 V10.2.0 (Jun. 2011).
Third Generation Partnership Project, "Technical Technical Specification Group Core Network and Terminals; Policy and Charging Control (PCC) over S9 reference point; Stage 3 (Release 11)," 3GPP TS 29.215 V11.1.0 (Jun. 2011).
Wikipedia, "Generic Bootstrapping Architecture," available at http://en.wikipedia.org/wiki/Generic_Bootstrapping_Architecture (last visited Jan. 11, 2013).
Wikipedia, "Mobile number portability," available at http://en.wikipedia.org/wiki/Mobile_number_portability (last visited Jan. 11, 2013).
Wikipedia, "OpenID," available at http://en.wikipedia.org/wiki/OpenID (last visited Jan. 11, 2013).
Ericsson, "Policy control in roaming and inter-system mobility scenarios," 3GPP TSG SA WG2 Architecture—S2#49, S2-052571 (Nov. 7-11, 2005).
QUALCOMM Europe, "Home network based policy control and Rx reference point," 3GPP TSG SA WG2 Meeting #64, S2-082092 (Apr. 7-11, 2008).
Balbas et al, 'Policy and Charging Control in the Evolved Packet System,' IEEE Communications Magazine, vol. 47, Issue 2, pp. 68-74 (Feb. 2009).
Third Generation Partnership Project, 'Technical Specification Group Services and System Aspects; 3GPP System Architecture Evolution (SAE); Security architecture (Release 11),' 3GPP TS 33.401 V11.5.0 (Sep. 2012).
Third Generation Partnership Project, 'Technical Specification Group Services and System Aspects; IP Multimedia Subsystem (IMS); Stage 2 (Release 5),' 3GPP TS 23.228 V5.15.0 (Jun. 2006).
Third Generation Partnership Project, 'Technical Specification Group Services and System Aspects; Service requirements for the Evolved Packet System (EPS) (Release 10),' 3GPP TS 22.278 V10.2.0 (Sep. 2010).
Third Generation Partnership Project, "3rd Generation Partnership Project; Technical Specification Group Services and System Aspects; Policy and charging control architecture (Release 7)," 3GPP TS 23.203 V7.14.1 (Jul. 2012).
Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 10)," 3GPP TS 29.272 V10.4.0 (Sep. 2011).
Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 10)," 3GPP TS 29.272 V10.6.0 (Mar. 2012).
Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 11)," 3GPP TS 29.272 V11.0.0 (Sep. 2011).
Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 11)," 3GPP TS 29.272 V11.4.0 (Sep. 2012).

(56) References Cited

OTHER PUBLICATIONS

Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 8)," 3GPP TS 29.272 V8.11.0 (Jun. 2011).

Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 9)," 3GPP TS 29.272 V9.10.0 (Mar. 2012).

Third Generation Partnership Project, "Technical Specification Group Core Network and Terminals; Evolved Packet System (EPS); Mobility Management Entity (MME) and Serving GPRS Support Node (SGSN) related Interfaces based on Diameter protocol (Release 9)," 3GPP TS 29.272 V9.8.0 (Sep. 2011).

Third Generation Partnership Project, "Technical Specification Group Core Network and Terminals; IP Multimedia (IM) Subsystem Sh interface; Signaling flows and message contents (Release 10)," 3GPP TS 29.328 V10.3.0 (Jun. 2011).

Third Generation Partnership Project, "Technical Specification Group Core Network and Terminals; IP Multimedia (IM) Subsystem Sh interface; Signaling flows and message contents (Release 10)," 3GPP TS 29.328 V10.7.0 (Sep. 2012).

Third Generation Partnership Project, "Technical Specification Group Core Network and Terminals; IP Multimedia (IM) Subsystem Sh interface; Signaling flows and message contents (Release 11)," 3GPP TS 29.328 V11.1.0 (Sep. 2011).

Third Generation Partnership Project, "Technical Specification Group Core Network and Terminals; IP Multimedia (IM) Subsystem Sh interface; Signaling flows and message contents (Release 11)," 3GPP TS 29.328 V11.5.0 (Sep. 2012).

Third Generation Partnership Project, "Technical Specification Group Core Network and Terminals; IP Multimedia (IM) Subsystem Sh interface; Signaling flows and message contents (Release 5)," 3GPP TS 29.328 V5.16.0 (Sep. 2009).

Third Generation Partnership Project, "Technical Specification Group Core Network and Terminals; IP Multimedia (IM) Subsystem Sh interface; Signaling flows and message contents (Release 6)," 3GPP TS 29.328 V6.15.0 (Sep. 2009).

Third Generation Partnership Project, "Technical Specification Group Core Network and Terminals; IP Multimedia (IM) Subsystem Sh interface; Signaling flows and message contents (Release 7)," 3GPP TS 29.328 V7.13.0 (Sep. 2009).

Third Generation Partnership Project, "Technical Specification Group Core Network and Terminals; IP Multimedia (IM) Subsystem Sh interface; Signaling flows and message contents (Release 8)," 3GPP TS 29.328 V8.13.0 (Jun. 2011).

Third Generation Partnership Project, "Technical Specification Group Core Network and Terminals; IP Multimedia (IM) Subsystem Sh interface; Signaling flows and message contents (Release 8)," 3GPP TS 29.328 V8.14.0 (Dec. 2011).

Third Generation Partnership Project, "Technical Specification Group Core Network and Terminals; IP Multimedia (IM) Subsystem Sh interface; Signaling flows and message contents (Release 9)," 3GPP TS 29.328 V9.10.0 (Sep. 2012).

Third Generation Partnership Project, "Technical Specification Group Core Network and Terminals; IP Multimedia (IM) Subsystem Sh interface; Signaling flows and message contents (Release 9)," 3GPP TS 29.328 V9.6.0 (Jun. 2011).

Third Generation Partnership Project, "Technical Specification Group Core Network and Terminals; Policy and Charging Control (PCC) over S9 reference point; Stage 3 (Release 10)," 3GPP TS 29.215 V10.6.0 (Jun. 2012).

Third Generation Partnership Project, "Technical Specification Group Core Network and Terminals; Policy and Charging Control (PCC) over S9 reference point; Stage 3 (Release 11)," 3GPP TS 29.215 V11.6.0 Sep. 2012).

Third Generation Partnership Project, "Technical Specification Group Core Network and Terminals; Policy and Charging Control (PCC) over S9 reference point; Stage 3 (Release 8)," 3GPP TS 29.215 V8.10.0 (Jun. 2011).

Third Generation Partnership Project, "Technical Specification Group Core Network and Terminals; Policy and Charging Control (PCC) over S9 reference point; Stage 3 (Release 8)," 3GPP TS 29.215 V8.14.0 (Jun. 2012).

Third Generation Partnership Project, "Technical Specification Group Core Network and Terminals; Policy and Charging Control (PCC) over S9 reference point; Stage 3 (Release 9)," 3GPP TS 29.215 V9.11.0 (Jun. 2012).

Third Generation Partnership Project, "Technical Specification Group Core Network and Terminals; Policy and Charging Control (PCC) over S9 reference point; Stage 3 (Release 9)," 3GPP TS 29.215 V9.7.0 (Jun. 2011).

Third Generation Partnership Project, "Technical Specification Group Core Network and Terminals; Policy and Charging Control over Rx reference point (Release 10)," 3GPP TS 29.214 V10.3.0 (Jun. 2011).

Third Generation Partnership Project, "Technical Specification Group Core Network and Terminals; Policy and Charging Control over Rx reference point (Release 10)," 3GPP TS 29.214 V10.7.0 (Sep. 2012).

Third Generation Partnership Project, "Technical Specification Group Core Network and Terminals; Policy and Charging Control over Rx reference point (Release 11)," 3GPP TS 29.14 V11.1.0 (Jun. 2011).

Third Generation Partnership Project, "Technical Specification Group Core Network and Terminals; Policy and Charging Control over Rx reference point (Release 11)," 3GPP TS 29.14 V11.6.0 (Sep. 2012).

Third Generation Partnership Project, "Technical Specification Group Core Network and Terminals; Policy and Charging Control over Rx reference point (Release 7)," 3GPP TS 29.214 V7.11.0 (Dec. 2010).

Third Generation Partnership Project, "Technical Specification Group Core Network and Terminals; Policy and Charging Control over Rx reference point (Release 7)," 3GPP TS 29.214 V7.12.0 (Sep. 2012).

Third Generation Partnership Project, "Technical Specification Group Core Network and Terminals; Policy and Charging Control over Rx reference point (Release 8)," 3GPP TS 29.214 V8.10.0 (Dec. 2010).

Third Generation Partnership Project, "Technical Specification Group Core Network and Terminals; Policy and Charging Control over Rx reference point (Release 8)," 3GPP TS 29.214 V8.13.0 (Sep. 2012).

Third Generation Partnership Project, "Technical Specification Group Core Network and Terminals; Policy and Charging Control over Rx reference point (Release 9)," 3GPP TS 29.214 V9.10.0 (Sep. 2012).

Third Generation Partnership Project, "Technical Specification Group Core Network and Terminals; Policy and Charging Control over Rx reference point (Release 9)," 3GPP TS 29.214 V9.7.0 (Jun. 2011).

Third Generation Partnership Project, "Technical Specification Group Core Network and Terminals; Policy and Charging Control signaling flows and Quality of Service (QoS) parameter mapping (Release 10)," 3GPP TS 29.213 V10.2.0 (Jun. 2011).

Third Generation Partnership Project, "Technical Specification Group Core Network and Terminals; Policy and Charging Control signaling flows and Quality of Service (QoS) parameter mapping (Release 10)," 3GPP TS 29.213 V10.7.0 (Sep. 2012).

Third Generation Partnership Project, "Technical Specification Group Core Network and Terminals; Policy and Charging Control signaling flows and Quality of Service (QoS) parameter mapping (Release 11)," 3GPP TS 29.213 V11.4.0 (Sep. 2012).

Third Generation Partnership Project, "Technical Specification Group Core Network and Terminals;.Policy and charging control signaling flows and Quality of Service (QoS) parameter mapping (Release 7)," 3GPP TS 29.213 V7.11.0 (Sep. 2010).

(56) References Cited

OTHER PUBLICATIONS

Third Generation Partnership Project, "Technical Specification Group Core Network and Terminals; Policy and charging control signaling flows and Quality of Service (QoS) parameter mapping (Release 7)," 3GPP TS 29.213 V7.12.0 (Sep. 2011).
Third Generation Partnership Project, "Technical Specification Group Core Network and Terminals; Policy and Charging Control signaling flows and Quality of Service (QoS) parameter mapping (Release 8)," 3GPP TS 29.213 V8.11.0 (Mar. 2011).
Third Generation Partnership Project, "Technical Specification Group Core Network and Terminals; Policy and Charging Control signaling flows and Quality of Service (QoS) parameter mapping (Release 8)," 3GPP TS 29.213 V8.15.0 (Sep. 2012).
Third Generation Partnership Project, "Technical Specification Group Core Network and Terminals; Policy and Charging Control signaling flows and Quality of Service (QoS) parameter mapping (Release 9)," 3GPP TS 29.213 V9.10.0 (Sep. 2012).
3rd Generation Partnership Project; Technical Specification Group Services and System Aspects; Identity management and 3GPP security interworking; Identity management and Generic Authentication Architecture (GAA) interworking (Release 10)', 3GPP Standard; 3GPP TR 33.924, 3RD Generation Partnership Project (3GPP), Mobile Competence Centre ; 650, Route Des Lucioles; F-06921 Sophia-Antipolis Cedex; France, vol. SA WG3, No. V10. 1.0, Jun. 16. 2011 (Jun. 16. 2011), pp. 1-40.

\* cited by examiner

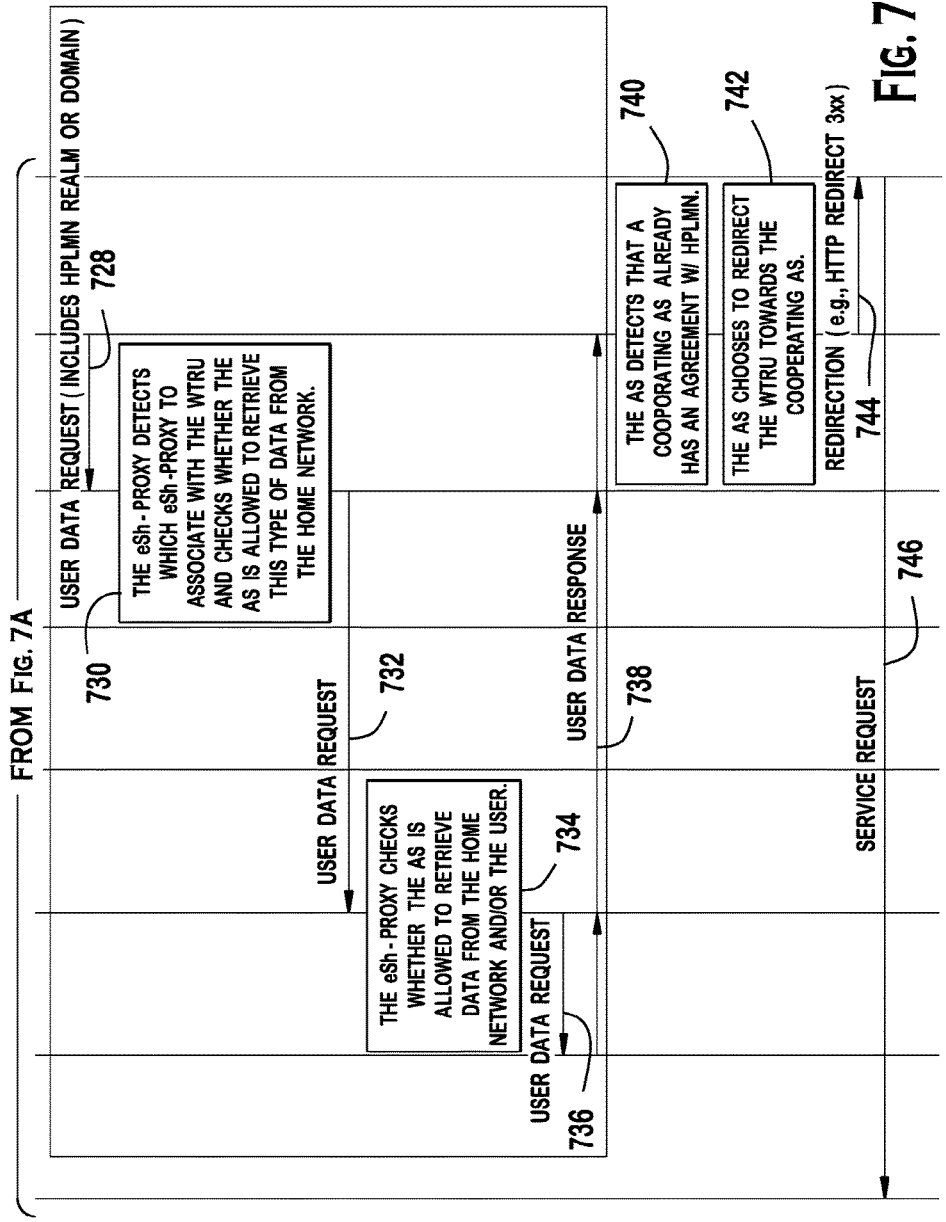

METHOD AND APPARATUS FOR ENABLING ACCESS TO APPLICATIONS INTEGRATED WITH A VISITED NETWORK

CROSS-REFERENCE TO RELATED APPLICATIONS

This application is a continuation of U.S. patent application Ser. No. 13/630,523, filed Sep. 28, 2012 and entitled "Method and Apparatus for Enabling Access To Applications Integrated with a Visited Network," which claims the benefit of U.S. Provisional Application No. 61/540,682 filed Sep. 29, 2011 and entitled "Method and Apparatus for Accessing Applications Integrated with a Visited Network," both of which are hereby incorporated by reference herein in their respective entireties.

BACKGROUND

Evolved Packet Core (EPC) enhancements to Support Interworking with Data Application Providers Third Generation Partnership Project (3GPP) working group provides solutions for internetworking between an application provider and a 3GPP mobile network operator core network. FIG. 17 shows the non-roaming case where the application platform is connected to the mobile network operator core network. Access and Internet protocol (IP) connectivity is provided by the mobile network operator. The third party application platforms may be application servers, (e.g., video-on-demand server, packet switched streaming (PSS) server, machine type communication (MTC) server, etc.), or may be third party software development platforms.

FIG. 18 shows the roaming case where a WTRU is roaming a visited public land mobile network (VPLMN) and accessing the application provided by the home public land mobile network (HPLMN). As shown in FIGS. 17 and 18, the mobile network operator may not own the application layer entities (e.g., application platforms). Alternatively, the mobile network operator may own the application layer entities. FIG. 18 shows the home-routed case where all traffic is routed to the home mobile network operator Evolved Packet System (EPS) and applications are delivered via roaming agreements between the mobile network operators.

SUMMARY

A method and apparatus for interworking between a mobile network operator and an application provider are disclosed. A network application function (NAF) may be co-located with an OpenID provider (OP) such that an application server may communicate with the NAF to access user data in a home subscriber server (HSS), to set information in the HSS, or to register events in the HSS via a bootstrapping server function (BSF). The interfaces between the BSF and the HSS, and between the BSF and the NAF may be enhanced to carry information that is available through the Sh interface between the application server and the HSS. The NAF may be located in the home network or outside the home network. The WTRU may be connected to a home network, or may be roaming in a visited network. When the WTRU is roaming in a visited network, the application server may interact with the visited network for quality of service (QoS) and charging control for the service.

Alternatively, an application server may be co-located with an NAF, and may authenticate the WTRU using Generic Bootstrapping Architecture (GBA). Once the user is authenticated, the application server may communicate with a BSF in a home network via an eZn-proxy function to access data in an HSS, to set information in the HSS, or to register events in the HS S.

Alternatively, in case a WTRU is roaming in a visited network and an application provider has an agreement with the visited network, the application server may communicate with the visited network for charging, policing, and user data access for serving the service request from the WTRU.

BRIEF DESCRIPTION OF THE DRAWINGS

A more detailed understanding may be had from the following description, given by way of example in conjunction with the accompanying drawings wherein:

FIGS. 7A and 7B are a signaling diagram of an example process for redirecting the user from the AS serving the VPLMN to the AS serving the HPLMN;

DETAILED DESCRIPTION

Figure 1A:
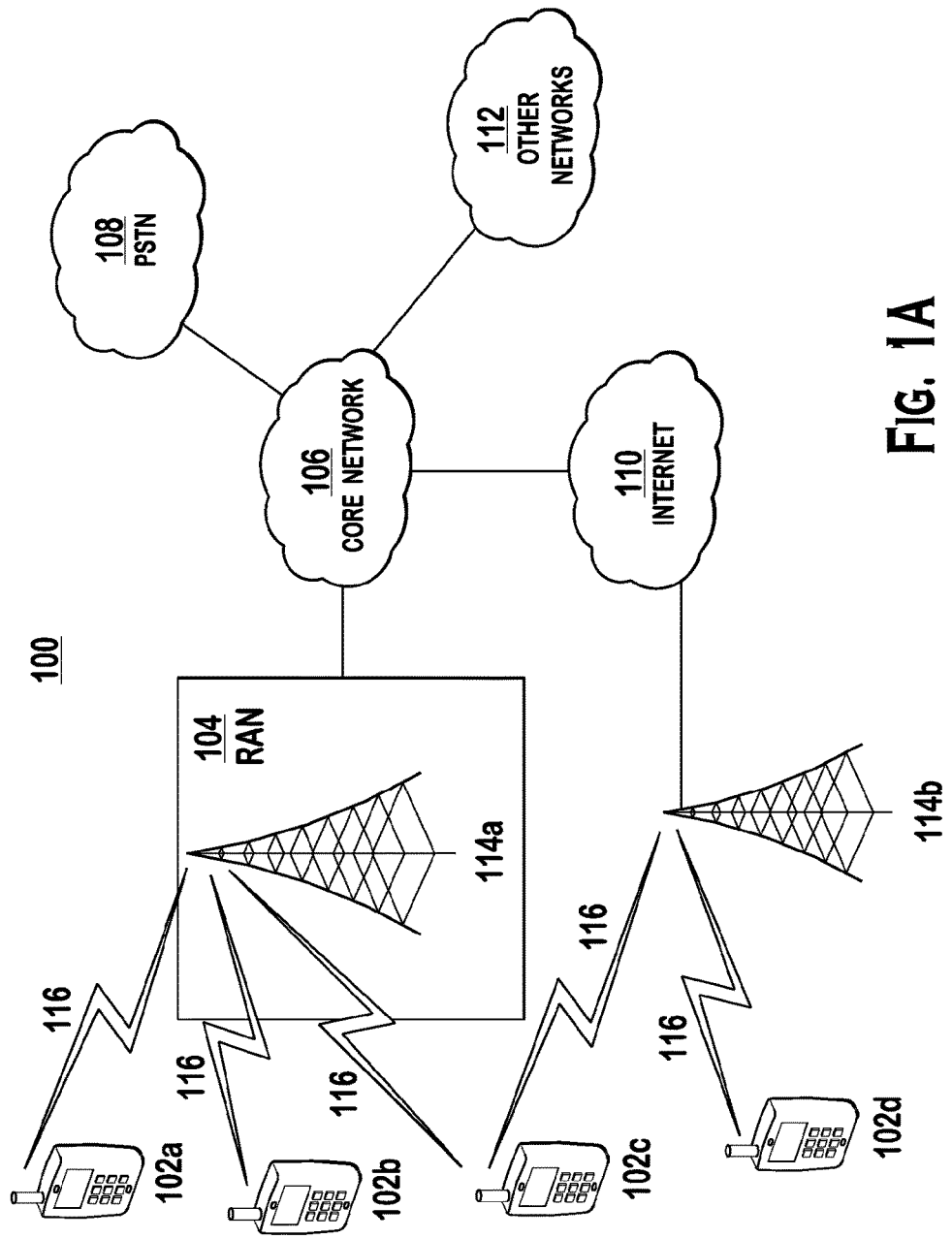
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LIE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
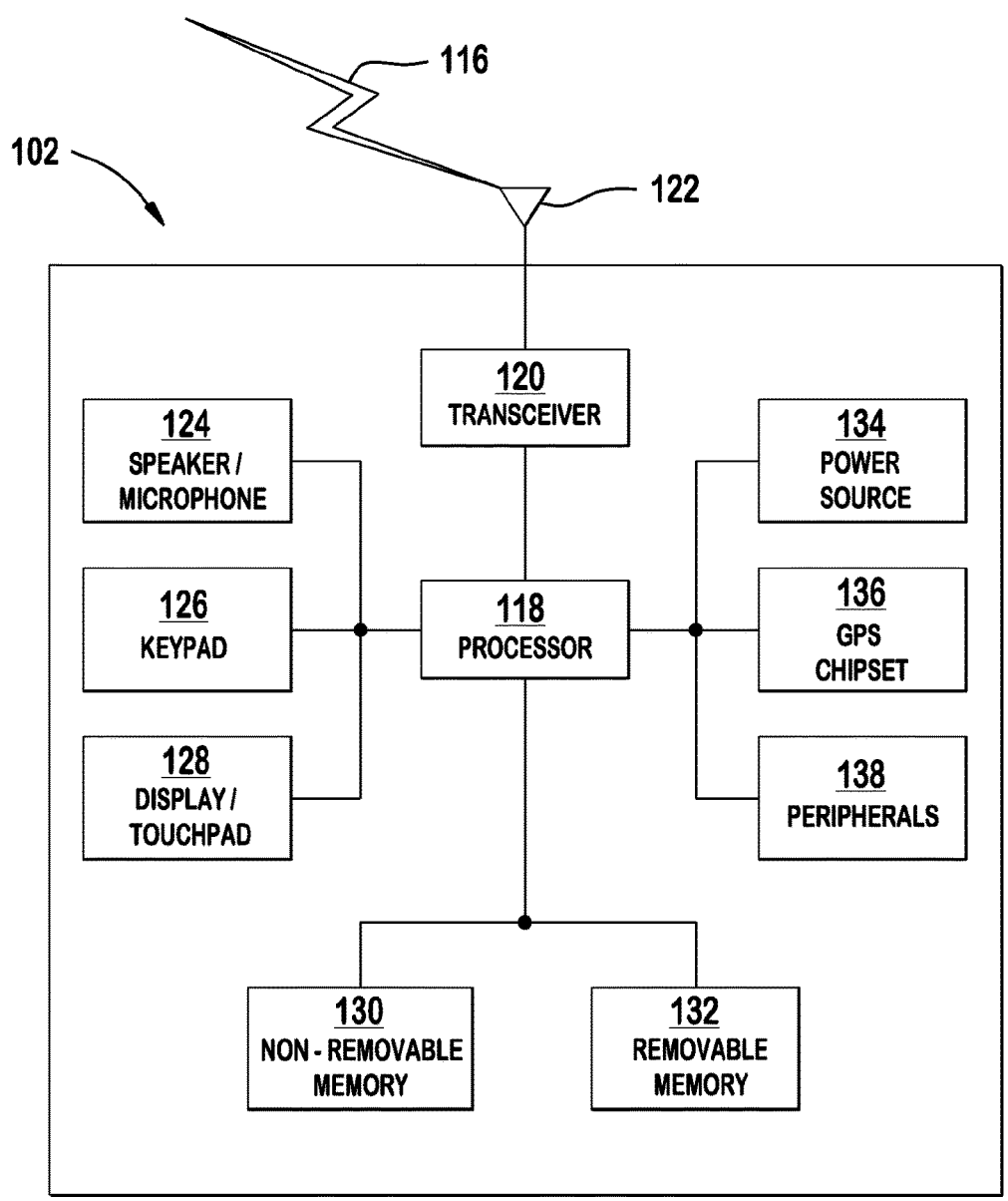
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
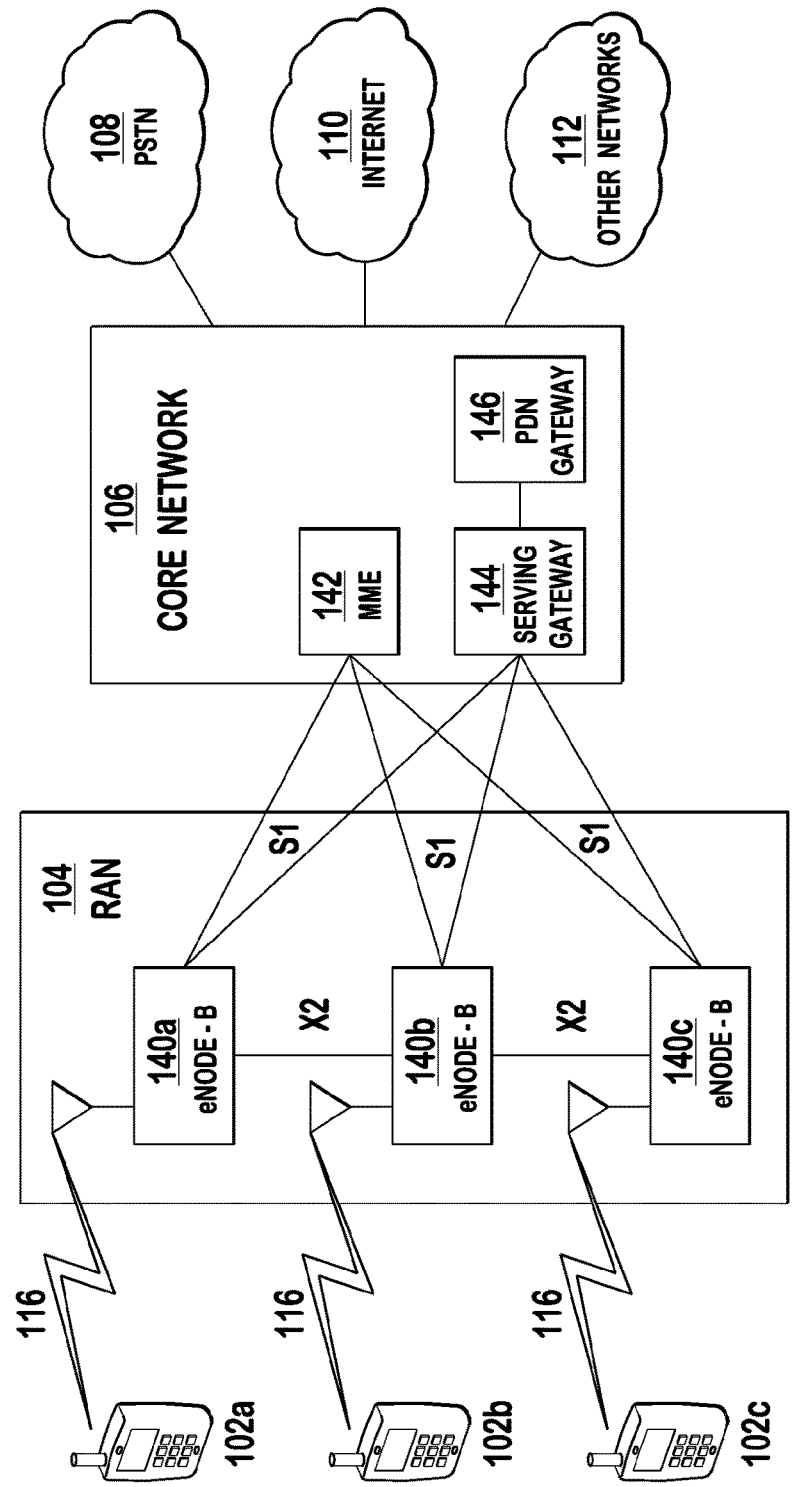
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Hereafter, the term "application" means a service offered by the mobile network operator or a third party to a mobile subscriber. The terms "application server" (AS) and "application platform" will be used interchangeably. Application platform is an AS such as video-on-demand server, PSS server, MTC server, etc. Alternatively, an application platform may be a software development platform.

A home public land mobile network (HPLMN) is a cellular network a particular user is a subscriber of. A visited public land mobile network (VPLMN) is a cellular network where a subscriber is not a subscriber of but is currently registered. The terms "HPLMN" and "home network" will be used interchangeably, and the terms "VPLMN" and "visited network" will be used interchangeably.

It should be noted that in the drawings, the AS may be shown as located in the visited network or in the home network, but the AS may be located either inside or outside the visited network or the home network.

Embodiments are disclosed hereafter for the cases where the application provider has an agreement with the visited network (i.e., VPLMN) operator in such a way that the AS may interconnect with the visited network for policing, charging, and obtaining user data. The application provider may or may not have an agreement with the home network (i.e., HPLMN) operator.

Figure 2:
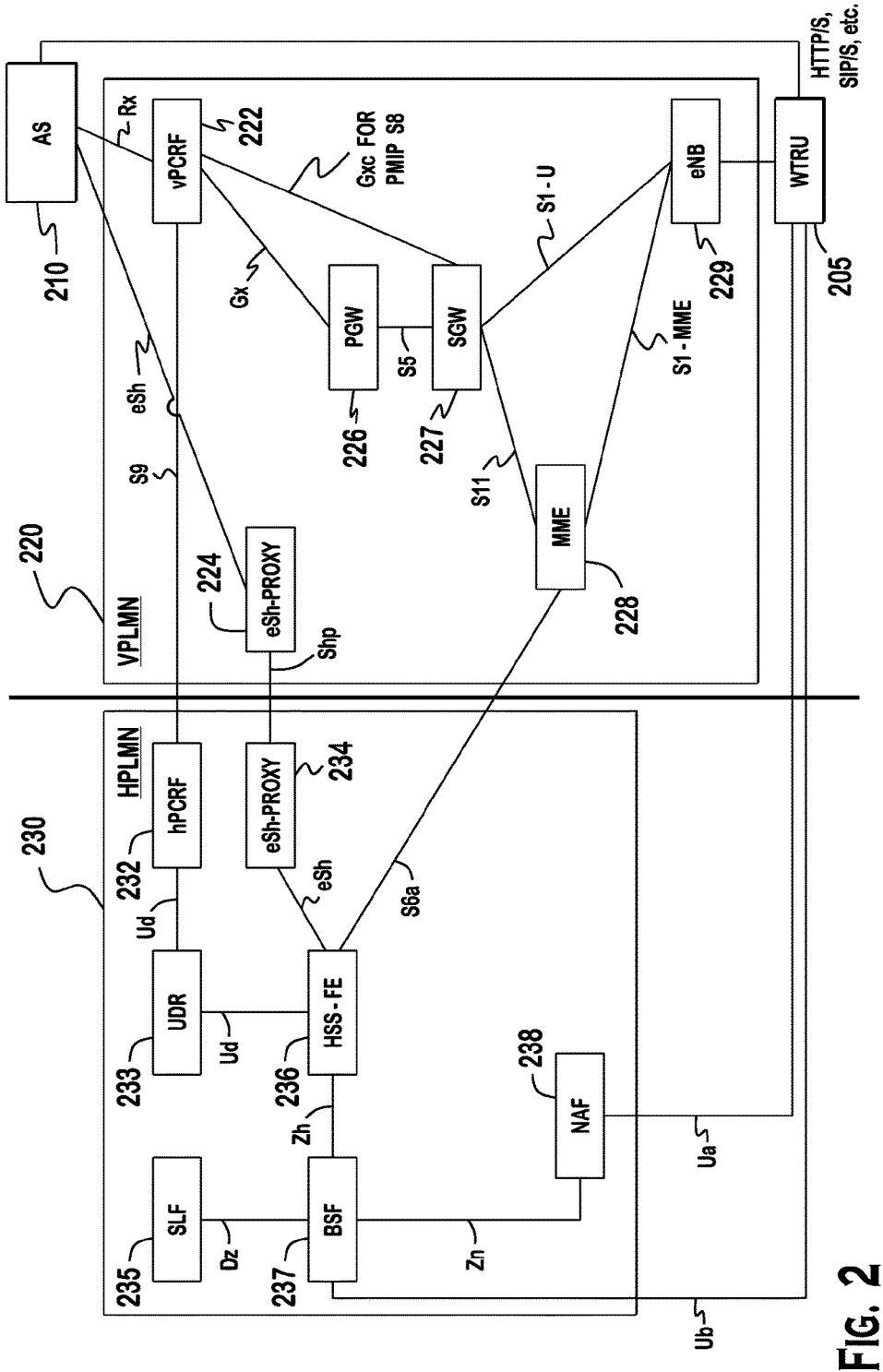
FIG. 2 shows an example network architecture wherein the application server (AS) is interconnected with the VPLMN.

In one embodiment, the AS-to-VPLMN interconnection and an eSh-proxy may be used for policing, charging, and obtaining user data. FIG. 2 shows an example network architecture wherein the AS is interconnected with the VPLMN. The AS 210 (e.g., non-IMS AS) is under the control of the application provider. Alternatively, the AS 210 may be under the control of the VPLMN operator. A WTRU 205 is roaming in the VPLMN 220. The VPLMN 220 includes, among others, a vPCRF 222, an eSh-proxy 224, a PGW 226, an SGW 227, an MME 228, and an eNB 229. The HPLMN 230 includes, among others, an hPCRF 232, a user data repository (UDR) 233, an eSh-proxy 234, a subscriber locator function (SLF) 235, an HSS-FE 236, a bootstrapping server function (BSF) 237, and a network application function (NAF) 238. A BSF 237 and an NAF 238 are part of the Generic Bootstrapping Architecture (GBA). A BSF 237 and a WTRU 205 mutually authenticates using the Authentication and Key Agreement (AKA) protocol, and agree on session keys that are afterwards applied between the WTRU 205 and the NAF 238. The SLF 235 is queried by the BSF 237 over Dz interface to get the name of the HSS containing the subscriber specific data. The SLF 235 may not be required if there is a single HSS or if the BSF 237 is configured or managed with a pre-defined HSS. The UDR 233 is a facility where user data can be accessed, stored, and managed in a common way. A front end (FE) is a core network functional entity or service layer entity or provisioning entity that can access user data stored in a repository.

The user of the WTRU 205 obtains the information about the service offered by the application provider, for example through a web portal, which may inform the user about service pricing and/or conditions. The user may then click on a link to a service uniform resource locator (URL). A request may then be sent from the WTRU 205 to the AS using hypertext transport protocol (HTTP), secure HTTP (HTTPS), session initiation protocol (SIP), secure SIP (SIPS), etc. The AS 210 may redirect the WTRU 205 towards an authentication server (now shown), such as OpenID provider (OP), for authentication of the user.

The authentication server may be co-located or in communication with the NAF 238. GBA may be used between the NAF 238 and the WTRU 205 for authentication purposes, and for securing the communication path between the WTRU 205 and the NAF 238. After the bootstrapping is completed, the WTRU 205 and the NAF 238 may use the session keys generated during the authentication between the WTRU 205 and the BSF 237 in securing the messages. The NAF 238 may communicate with the home BSF 237 directly if the NAF 238 is located in the home network, or through a Zn-proxy if the NAF is located in the visited network. FIG. 2 shows that the NAF 238 is located in the HPLMN 230 but an NAF may be located in the VPLMN 220 or in an outside network. When the NAF 238 is not located in the HPLMN 230, Zn-proxy may be used. Zn-proxy is a proxy function between the visited NAF and the subscriber's home BSF. Zn-proxy may be used by the visited NAF in case where a WTRU is roaming into another network than the home network.

Once the WTRU 205 is authenticated with the AS 210, the AS 210 may use its Rx interface to the visited Policy Control Rules Function (vPCRF) 222 to control policy and charging for the service. The Rx reference point resides between an application function (AF) and a PCRF. The Rx reference point enables transport of application level session information from the AF to the PCRF. Such information includes, but is not limited to, IP filter information to identify the service data flow for policy control and/or differentiated charging, media/application bandwidth requirements for quality of service (QoS) control, and the like. The vPCRF 222 may forward Rx messages from the AS 210 to the home Policy Control Rules Function (hPCRF) 232 over S9. The hPCRF 232 may obtain user subscription information, and then send a reply to the vPCRF 222, which replies to the AS 210. The hPCRF 232 may use S9 to interact with Policy and Charging Enforcement Function (PCEF)/Bearer Binding and Event Reporting Function (BBERF) via the vPCRF 222.

When the AS 210 needs to access user data (e.g., user profile), the AS 210 may use enhanced Sh (eSh) interface. Sh interface is used to exchange user profile information (e.g., user related data, group lists, user service related information, user location information, or charging function addresses, etc.) between the AS 210 and an HSS-FE 236. In one embodiment, the conventional Sh interface is enhanced (e.g., it is secured) to be used outside of the boundaries of the operator's network.

The user data may be obtained from the home network. The AS 210 may use the Mobile Station International Subscriber Directory Number (MSISDN) obtained during the authentication procedure (e.g., GBA/OpenID procedure) to identify the user over eSh.

A new Sh-proxy network function (eSh-proxy) 224, 234 is introduced to enable inter-operator communication for the eSh interface. The eSh-proxy 224, 234 may relay eSh messages between the VPLMN 220 and the HPLMN 230 in a secure manner to ensure confidentiality of user information. A new Shp reference point (eSh) is introduced to relay the eSh protocol messages between the eSh-proxies 224, 234. The eShp reference point may be used to setup the secure interconnection between the eSh-proxies 224, 234. It may be used to exchange other information such as policies.

The eSh-proxy 224, 234 may enforce policies derived from the application roaming agreements between the VPLMN 220 and the HPLMN 230. For example, certain class of applications may obtain access to the user data and this may be enforced by the eSh-proxy 224, 234. The eSh-proxy 224, 234 may limit the scope of user data access based on authorization from the HPLMN 230 (e.g., user profile or home network policy may restrict the type of user data accessible by the visited network applications). The eSh-proxy 224, 234 may record operations to enable verification of inter-operator agreements (e.g., on volume) or to enable billing of application providers (for usage of inter-operator Shp interface).

The AS 210 may determine if a given user is visiting the network so that the AS 210 can make the decision to use the eSh-proxy 224 to access user data when needed. If the user is a subscriber of the VPLMN 220 (i.e., the user is not visiting the VPLMN 220), the AS 210 may instead communicate with the VPLMN HS S (not shown) to obtain user data.

In one embodiment, in order to determine whether the WTRU 205 is visiting the VPLMN 220, the AS 210 may use the Rx interface to the PCRF before accessing any user data, and from the Rx initial session initiation answer message, the AS 210 may obtain the Diameter realm and hostname of the hPCRF 232. The AS 210 may compare this information with its configuration, and determine that the PCRF end point is not within the VPLMN 220, which is also explained with reference to FIGS. 3A and 3B below. The AS 210 may then determine that it needs to communicate with the eSh-proxy 224. The AS 210 may use the realm information (or alternatively using the domain name obtained from the hostname) when communicating with the eSh-proxy 224. For example, the AS 210 may set the Diameter Destination-Realm to the value obtained from the hPCRF 232. The Diameter Destination-Realm is of type DiameterIdentity, and contains the realm the message is to be routed to. The eSh-proxy 224 maintains a mapping between this information and a peer eSh-proxy 234 located in the HPLMN 230.

In another embodiment, the GBA/OpenID integration may be used to provide enough information to the AS 210 to determine the home network of the WTRU 205. For example, the OpenID provider/NAF may provide the MSISDN of the WTRU 205 to the AS 210 during the OpenID procedure. The AS 210 may then use a lookup service to obtain the home network identity for the MSISDN.

The operator specific identification that can be provided to the AS 210 by the OpenID provider/NAF is the MSISDN or the Bootstrap Transaction ID (B-TID). The B-TID is used to bind the subscriber identity to the keying material in reference points Ua, Ub and Zn. Alternatively, the OpenID provider/NAF may provide the home network identification to the AS 210 in addition to the MSISDN or the B-TID. The home network identification may be, for example, mobile network code (MNC)+mobile country code (MCC), or a Diameter realm that the eSh-proxy may associate with a particular PLMN.

It should be noted that the embodiments and description disclosed above are applicable to any embodiments disclosed hereafter.

Figure 3A:
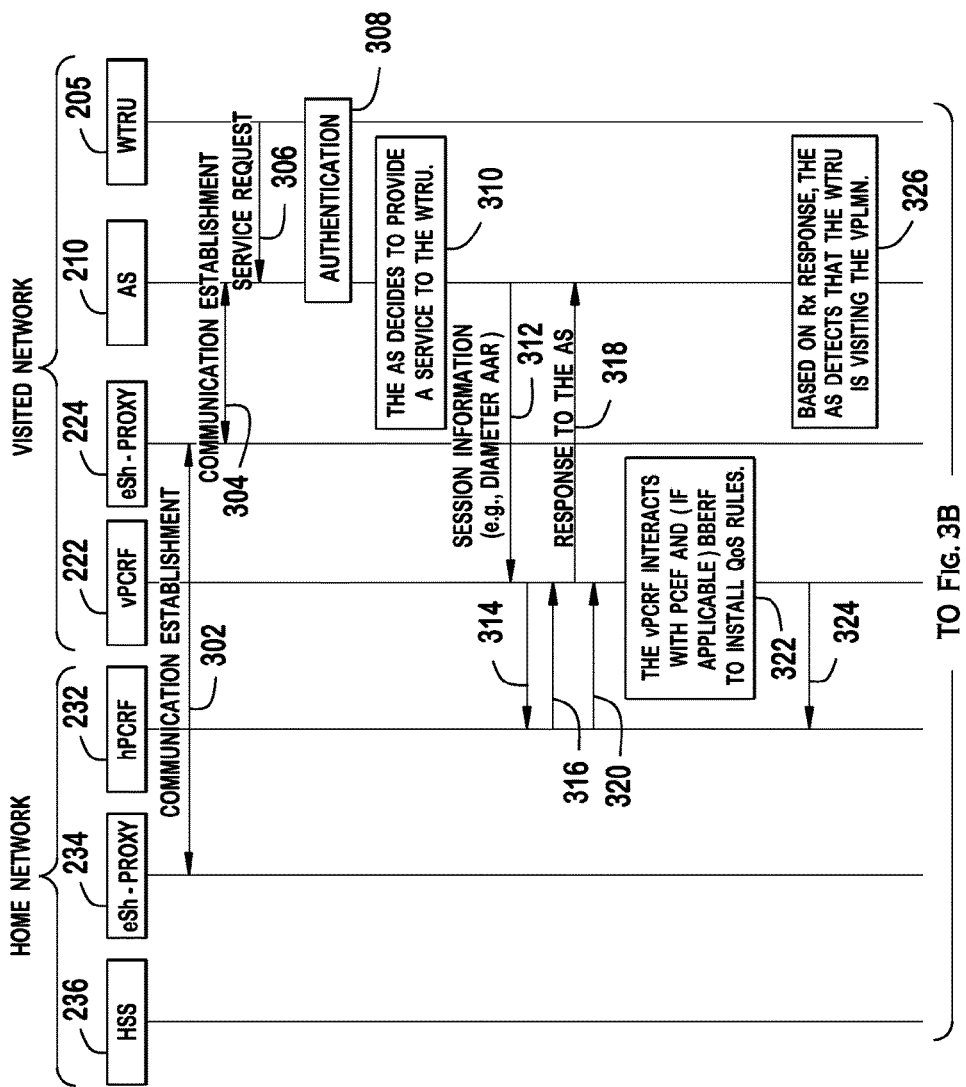
FIGS. 3A and 3B are a signaling diagram of an example process for authentication, session policy/charging initiation and user data request in case the application provider has an agreement with the visited network operator, but not with the home network operator in accordance with one embodiment.
Figure 3B:
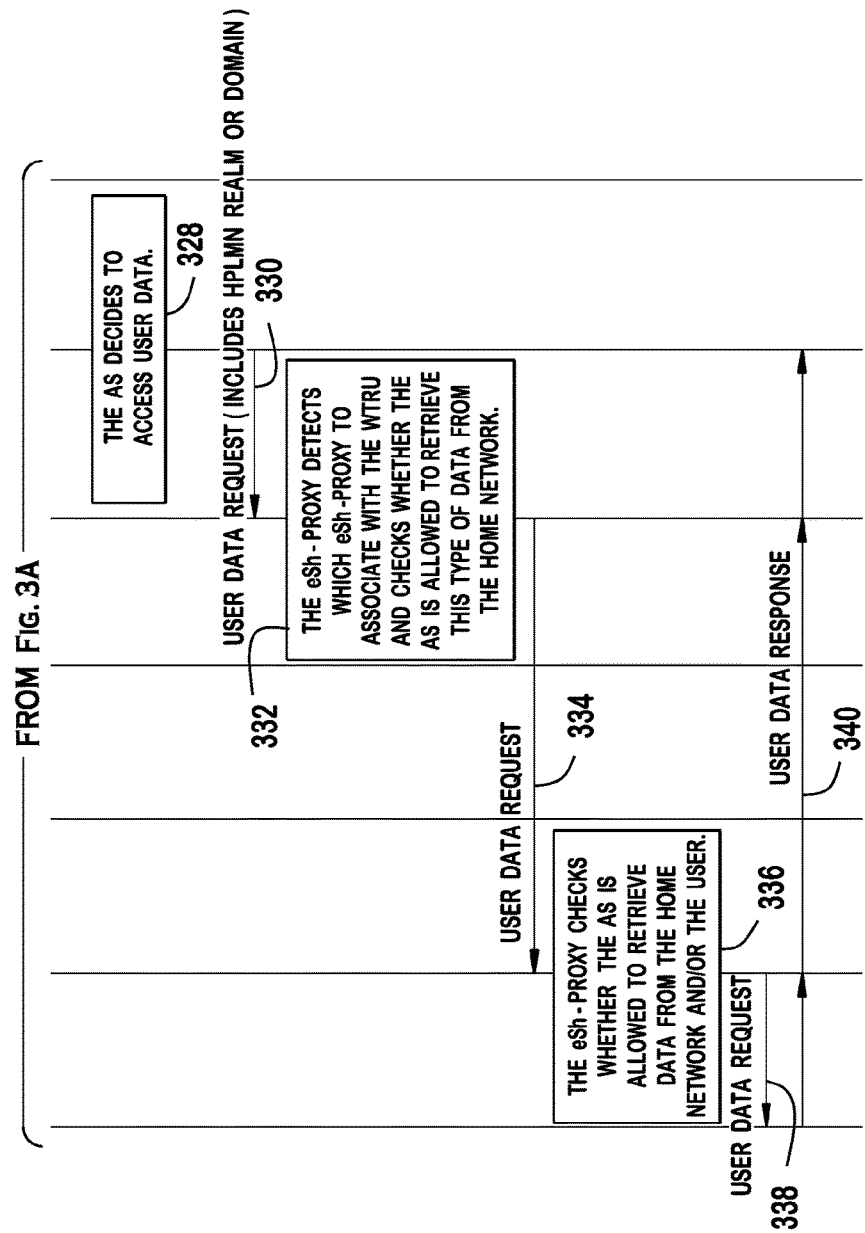

FIGS. 3A and 3B are a signaling diagram of an example process for authentication, session policy/charging initiation and user data request in case the application provider has an agreement with the visited network operator, but not with the home network operator in accordance with one embodiment. Communication is established between the Sh-proxies 224, 234 of the VPLMN 220 and the HPLMN 230 (302). Communication is also established between the eSh-proxy 224 in the VPLMN 220 and the AS 210 (304). The eSh-proxy-to-eSh-proxy and eSh-proxy-to-AS communication may be pre-established, or alternatively may be established on-demand.

A WTRU 205 sends a service request to the AS 210 (306). An authentication procedure is performed between the WTRU 205 and the AS 210, which also involves other nodes (308). Once the WTRU is authenticated, the AS 210 decides to provide the service to the WTRU 205 (310).

The AS 210 provides the session information to the vPCRF 222 by sending a Diameter AA-Request (AAR) for a new Rx Diameter session (312). The vPCRF 222 may store the session information and forward the Diameter AAR to the hPCRF 232 (314). The vPCRF 222 may employ operator policies and reject the AAR from the AS 210 if the provided session information is not acceptable. The hPCRF 232 stores the received session information, and responds to the vPCRF 224 with a Diameter AA-Answer (AAA) (316). If the hPCRF 232 requires subscription-related information and does not have it, the hPCRF 232 sends a request to the subscriber policy register (SPR) in order to receive the information including the allowed service(s), quality of service (QoS) information, policy and charging control (PCC) rules information, and the like. The vPCRF 222 forwards the Diameter AAA to the AS 210 (318). The hPCRF 232 may interact with the Policy and Charging Enforcement Function (PCEF)/Bearer Binding and Event Reporting Function (BBERF) via the vPCRF 222 for PCRF-initiated IP-CAN session modification (320, 322, 324).

Based on the Rx response (i.e., the Diameter AAA), the AS 210 may detect that the WTRU 205 is visiting the VPLMN 220 (326). It should be noted that other methods disclosed above may be used to determine that the WTRU 205 is visiting the VPLMN 220.

The AS 210 decides to access user data and send a user data request to the eSh-proxy 224 (328, 330). The user data request may include HPLMN realm or domain and the information provided by the AS 210 to the eSh-proxy 224 enables locating which HPLMN eSh-proxy to communicate with.

The eSh-proxy 224 detects which eSh-proxy to associate with the WTRU 205 and may check whether the AS 210 is allowed to retrieve this type of data from the HPLMN (332). The eSh-proxy 224 then sends a user data request to the eSh-proxy 234 in the HPLMN 230 (334). The eSh-proxy 234 may also check whether the AS 210 is allowed to retrieve data from the HPLMN and/or the user (336). If it is determined so, the eSh-proxy 234 sends a user data request to the home subscriber server (HSS) 236 (338). A user data response is then send from the HSS 236 to the AS 210 via the eSh-proxies 234, 224 (340).

Embodiments are disclosed hereafter for the cases where the application provider has an agreement with both the home network and the visited network operators in such a way that the AS may interconnect with the home network and/or the visited network for policing, charging, and obtaining user data.

Figure 4:
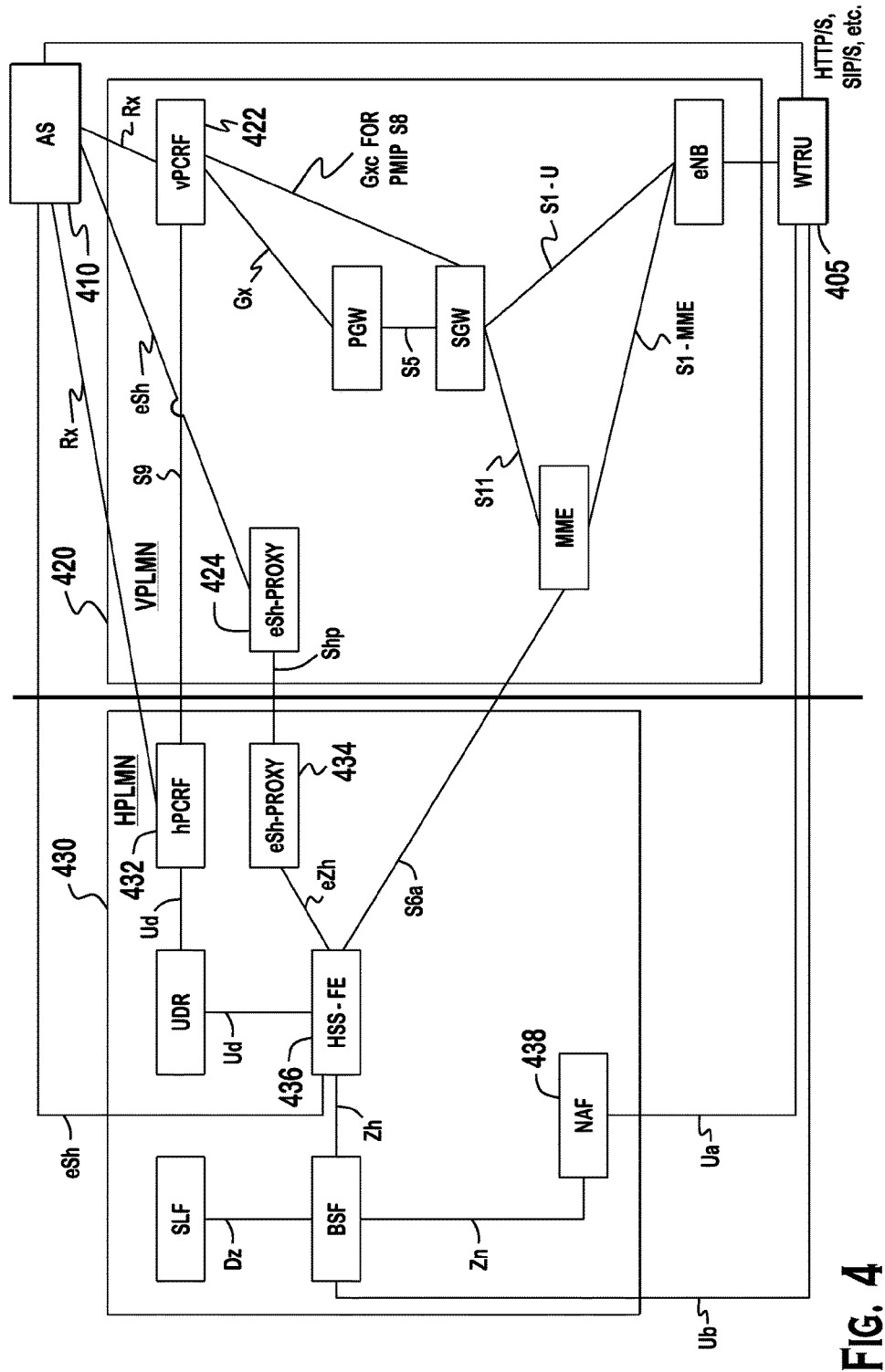
FIG. 4 shows an example network architecture wherein an AS is interconnected with both the home network and the visited network.

FIG. 4 shows an example network architecture wherein an AS is interconnected with both the home network and the visited network. The AS 410 may use any methods disclosed above to detect that the WTRU 405 is visiting the VPLMN 420. The AS 410 may additionally communicate with the eSh-proxy 424 to obtain the HPLMN of the WTRU 405, for example, in case where the AS 410 has information to determine that the WTRU 405 is visiting the VPLMN 420, but does not have enough information to know what its HPLMN is. The AS 410 is interconnected with both the VPLMN 420 and the HPLMN 430. The AS 410 may be under the control of the application provider. Alternatively, the AS 410 may be under the control of the VPLMN network operator.

If the AS 410 recognizes based on its internal state or configuration that the AS 410 also has an agreement with the HPLMN 430, the AS 410 may choose to use its direct interconnection to the HPLMN 430 to provide the service. Alternatively, the AS 410 may instead choose to use its VPLMN interconnection. In this case, the AS 410 may follow the policy to use the VPLMN interconnection for traffic routed through the VPLMN's PGW 426.

FIG. 4 shows that an NAF 438 is located in the HPLMN 430 but an NAF may also be located in the VPLMN 420 or in an outside network. When the NAF 438 is not located in the HPLMN 430, Zn-proxy may be used. An OpenID authentication server may incorporate NAF and Zn-proxy functions.

Figure 5A:
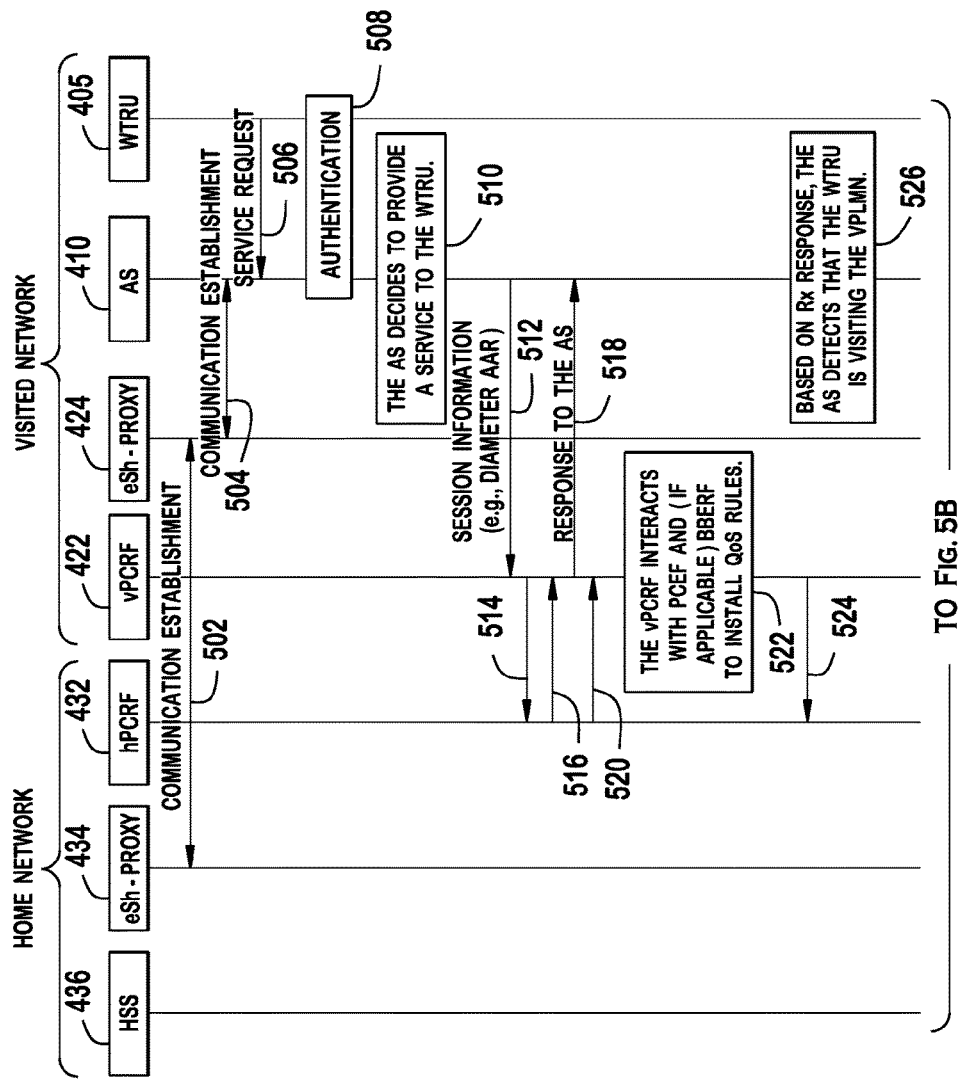
FIGS. 5A-5C are a signaling diagram of an example process for authentication, session policy/charging initiation and user data request where the application provider has an agreement with both the home network and visited network operators.
Figure 5B:
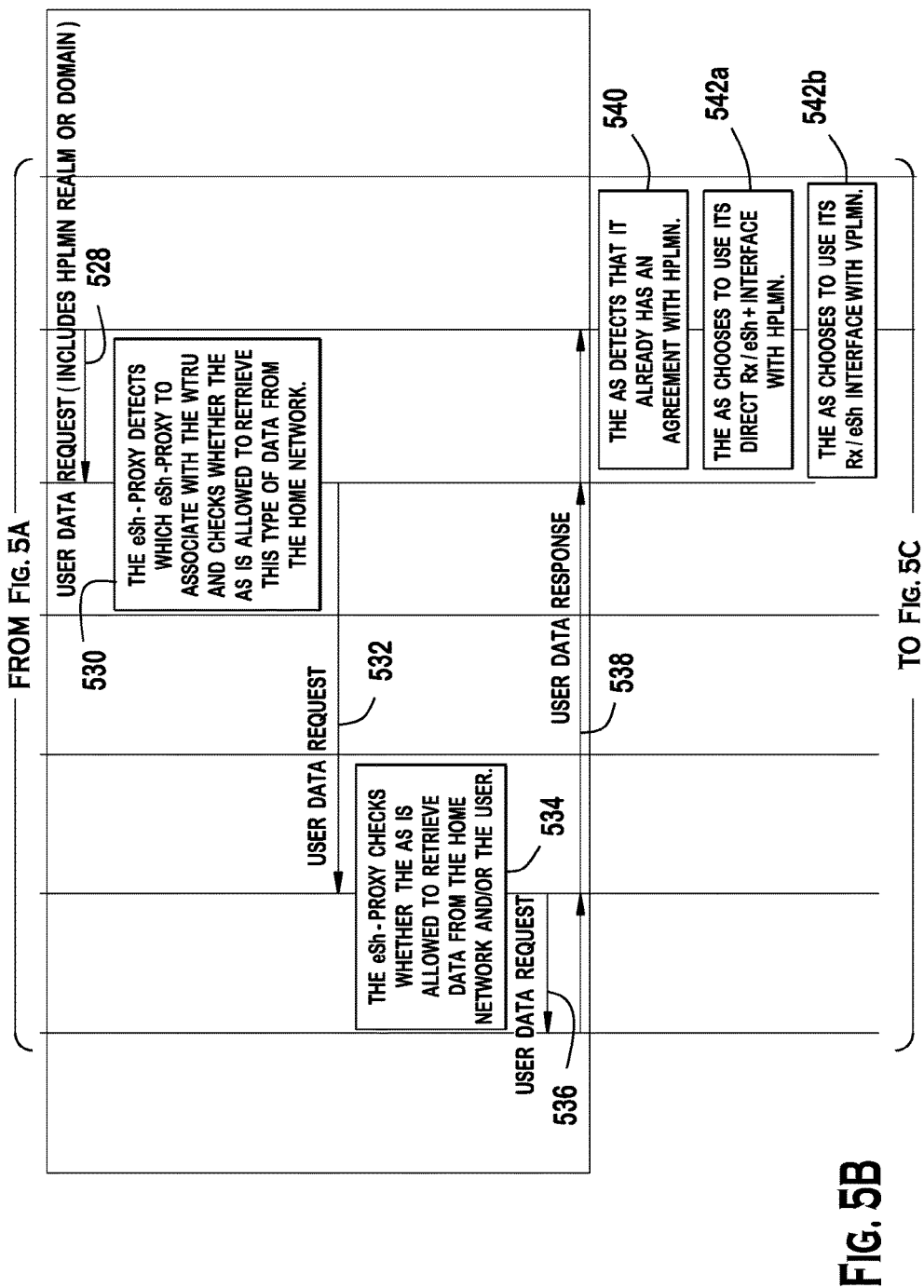
Figure 5C:
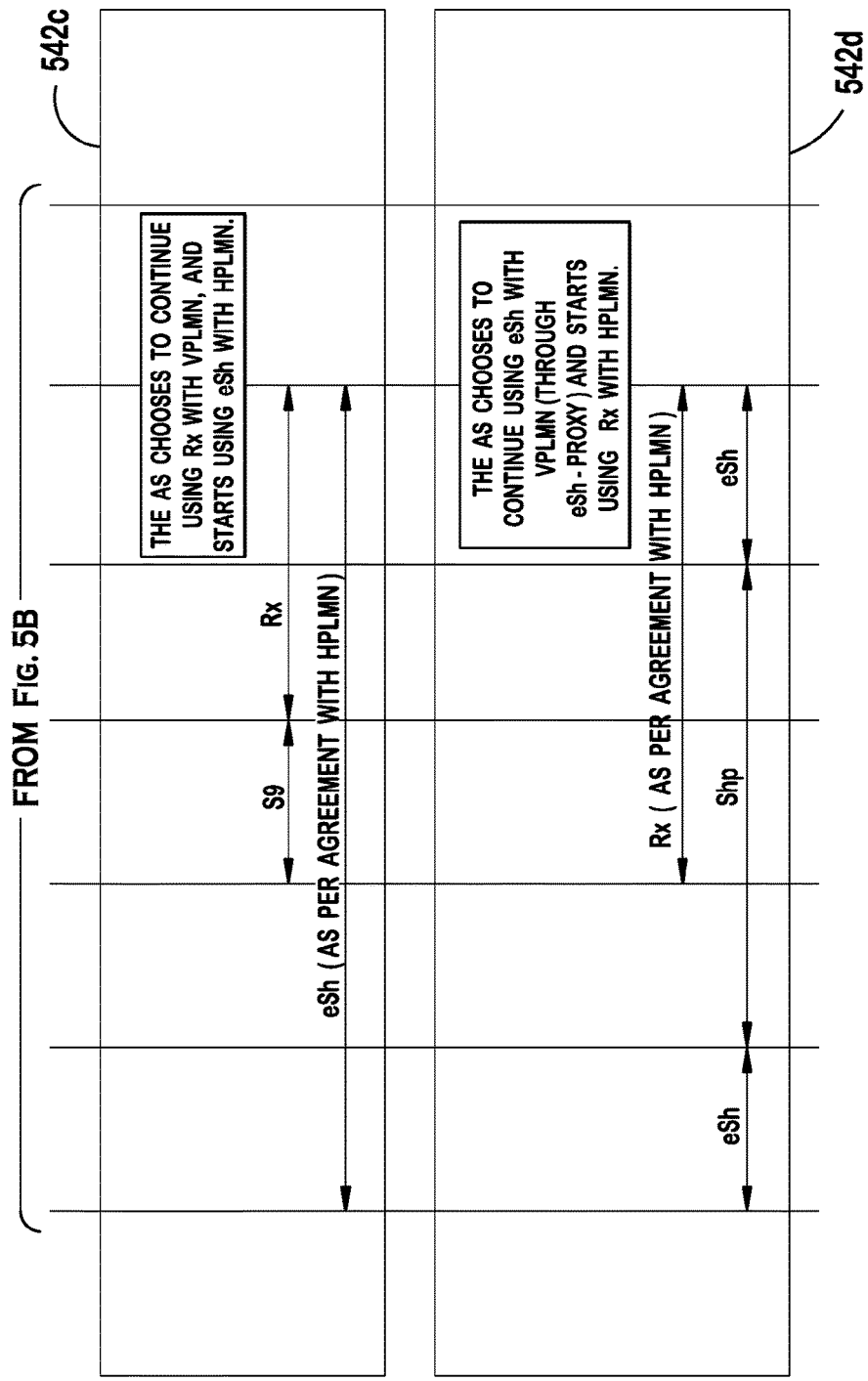

FIGS. 5A-5C are a signaling diagram of an example process for authentication, session policy/charging initiation and user data request where the application provider has an agreement with both the home network and visited network operators. Communication is established between the Sh-proxies 424, 434 of the VPLMN 420 and the HPLMN 430 (502). Communication is also established between the eSh-proxy 424 in the VPLMN and the AS 410 (504). The eSh-proxy-to-eSh-proxy and eSh-proxy-to-AS communication may be pre-established, or alternatively may be established on-demand.

A WTRU 405 sends a service request to the AS 410 (506). An authentication procedure is performed between the WTRU 405 and the AS 410, which also involves other nodes (508). Once the WTRU 405 is authenticated, the AS 410 decides to provide the service to the WTRU 405 (510).

The AS 410 provides the session information to the vPCRF 422 by sending a Diameter AAR for a new Rx Diameter session (512). The vPCRF 422 stores the session information and forwards the Diameter AAR to the hPCRF 432 (514). The vPCRF 422 may employ operator policies and reject the AAR from the AS 410 if the provided session information is not acceptable. The hPCRF 432 stores the received session information, and responds to the vPCRF 422 with a Diameter AAA (516). If the hPCRF 432 requires subscription-related information and does not have it, the hPCRF 432 sends a request to the SPR in order to receive the information including the allowed service(s), QoS information, PCC rules information, and the like. The vPCRF 422 forwards the Diameter AAA to the AS 410 (518). The hPCRF 432 may interact with the PCEF/BBERF via the vPCRF 422 for PCRF-initiated IP-CAN session modification (520, 522, 524).

Based on the Rx response (i.e., the Diameter AAA), the AS 410 may detect that the WTRU 405 is visiting the VPLMN 420 (526). It should be noted that other methods disclosed above may be used to determine that the WTRU 405 is visiting the VPLMN 420.

The AS 410 may or may not have enough information to determine the HPLMN of the WTRU 405. If the AS 410 does not have enough information to determine the HPLMN of the WTRU 405, the AS 410 may send a user data request to the eSh-proxy 424 (528). The user data request may include HPLMN realm or domain and the information provided by the AS 410 to the eSh-proxy 424 enables locating which HPLMN eSh-proxy to communicate with. The eSh-proxy 424 detects which eSh-proxy to associate with the WTRU 405 and may check whether the AS 410 is allowed to retrieve this type of data from the HPLMN 430 (530). The eSh-proxy 424 then sends a user data request to the eSh-proxy 434 in the HPLMN 430 (532). The eSh-proxy 434 may check whether the AS 410 is allowed to retrieve data from the HPLMN and/or the user (534). If it is determined so, the eSh-proxy 434 sends a user data request to the HSS 436 (536). A user data response is then forwarded from the HSS 436 to the AS 410 via the eSh-proxies 434, 424 (538). If the AS 410 has enough information to determine the HPLMN of the WTRU 405, the steps 528-538 may be skipped.

As the HPLMN of the WTRU 405 is determined, the AS 410 detects that the AS 410 has an agreement with the HPLMN 430 (540). In one embodiment, the AS 410 may choose to use its direct Rx/eSh interface with the HPLMN 430 (542a). The AS 410 may first terminate the IP-CAN session through the vPCRF 422. Alternatively, the AS 410 may choose to use its Rx/eSh interface with the VPLMN 420 (542b). Alternatively, the AS 410 may choose to continue using Rx with the VPLMN 420, and may start using eSh with the HPLMN 430 (542c). Alternatively, the AS 410 may choose to continue using eSh with the VPLMN 420 (through eSh-proxy) and start using Rx with the HPLMN 430 (542d). If Rx was used earlier, the AS 410 may terminate the IP-CAN session through the vPCRF 422.

If the AS 410 recognizes that the same service may be provided by a cooperating AS with a relationship to the HPLMN 430, the AS 410 may choose to redirect the user towards the cooperating AS, for example, using an application level redirection such as HTTP redirect.

Figure 6:
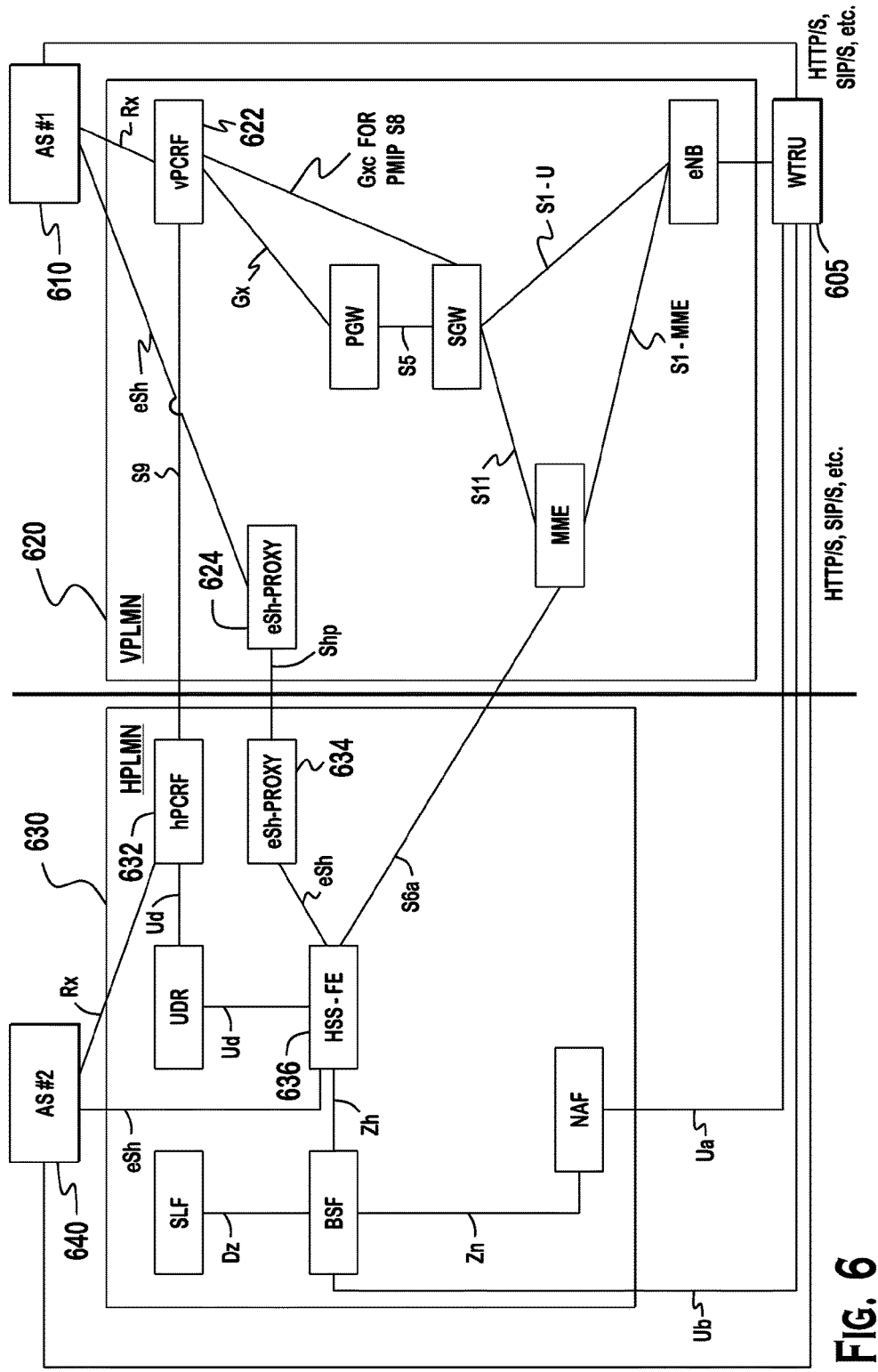
FIG. 6 shows an example network architecture wherein the application provider deploy multiple application servers.

FIG. 6 shows an example network architecture wherein the application provider deploy multiple application servers. The AS 610 is interconnected with the VPLMN 620 and another AS 640 is interconnected with the HPLMN 630. The application servers 610, 640 may be under the control of the application provider, or alternatively may be under the control of the network operator(s). FIG. 6 shows that an NAF is located in the HPLMN 630 but an NAF may be located in the VPLMN 620 or in an outside network. When an NAF is not located in the HPLMN 630, Zn-proxy may be used. An OpenID authentication server may incorporate NAF and Zn-proxy functions. The application provider may use redirection to ensure that roaming users trying to access the AS 610 in the visited network gets redirected to the AS 640 serving its home network.

Figure 7A:
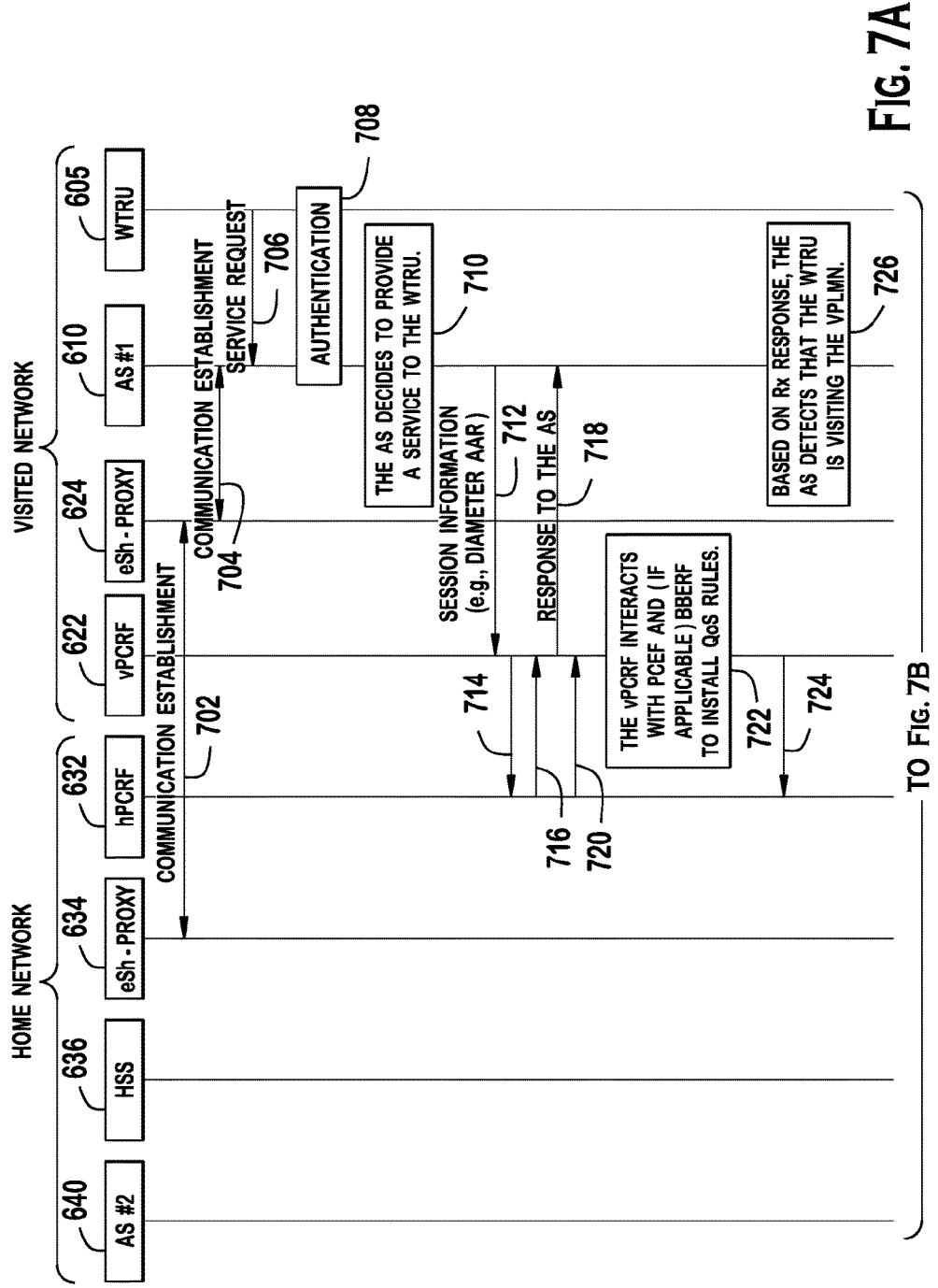

FIGS. 7A and 7B are a signaling diagram of an example process for redirecting the user from the AS 610 serving the VPLMN 620 to the AS 640 serving the HPLMN 630. Communication is established between the Sh-proxies 624, 634 of the VPLMN 620 and the HPLMN 630 (702). Communication is also established between the eSh-proxy 624 in the VPLMN 620 and the AS 610 (704). The eSh-proxy-to-eSh-proxy and eSh-proxy-to-AS communication may be pre-established, or alternatively may be established on-demand.

A WTRU 605 sends a service request to the AS 610 (706). An authentication procedure is performed between the WTRU 605 and the AS 610, which also involves other nodes (708). Once the WTRU 605 is authenticated, the AS 610 decides to provide the service to the WTRU 605 (710).

The AS 610 provides the session information to the vPCRF 622 by sending a Diameter AAR for a new Rx Diameter session (712). The vPCRF 622 stores the session information and forwards the Diameter AAR to the hPCRF 632 (714). The vPCRF 622 may employ operator policies and reject the AAR from the AS 610 if the provided session information is not acceptable. The hPCRF 632 stores the received session information, and responds to the vPCRF 622 with a Diameter AAA (716). If the hPCRF 632 requires subscription-related information and does not have it, the hPCRF 632 sends a request to the subscriber policy register (SPR) in order to receive the information including the allowed service(s), QoS information and PCC rules information. The vPCRF 622 forwards the Diameter AAA to the AS 610 (718). The hPCRF 632 may interact with the PCEF/BBERF via the vPCRF 622 for PCRF-initiated IP-CAN session modification (720, 722, 724).

Based on the Rx response, the AS 610 may detect that the WTRU 605 is visiting the VPLMN 620 (726). It should be noted that other methods disclosed above may be used to determine that the WTRU 605 is visiting the VPLMN 620.

The AS 610 may or may not have enough information to determine the HPLMN of the WTRU 605. If the AS 610 does not have enough information to determine the HPLMN of the WTRU 605, the AS 610 may send a user data request to the eSh-proxy 624 (728). The user data request may include HPLMN realm or domain and the information provided by the AS 610 to the eSh-proxy 624 enables locating which HPLMN eSh-proxy to communicate with. The eSh-proxy 624 detects which eSh-proxy to associate with the WTRU 605 and may check whether the AS 610 is allowed to retrieve this type of data from the home network (730). The eSh-proxy 624 then sends a user data request to the eSh-proxy 634 in the HPLMN 630 (732). The eSh-proxy 634 may check whether the AS 610 is allowed to retrieve data from the HPLMN 630 and/or the user (734). If it is determined so, the eSh-proxy 634 sends a user data request to the HSS 636 (736). A user data response is then forwarded from the HSS 636 to the AS 610 via the Sh-proxies 634, 624 (738). If the AS 610 has enough information to determine the HPLMN of the WTRU 605, the steps 728-738 may be skipped.

As the HPLMN of the WTRU 605 is determined, the AS 610 detects that the cooperating AS 640 has an agreement with the HPLMN 630 (740). In one embodiment, the AS 610 may continue delivering the service without redirecting the WTRU 605 to the cooperating AS 640. Alternatively, the AS 610 may choose to redirect the WTRU 605 towards the cooperating AS 640 (742). If Rx was used earlier, the AS 610 may terminate the IP-CAN session with the vPCRF 622. The AS 610 sends a redirection request (e.g., HTTP Redirect) to the WTRU 605 (744). The WTRU 605 then sends a service request to the AS 640 serving the HPLMN 630 (746).

In another embodiment, the WTRU 605 may be redirected from the AS 640 in the home network to the AS 610 in the visited network. For example, if the service generates a lot of traffic, the application provider may redirect users towards the AS 610 interconnected with the visited network.

Figure 8:
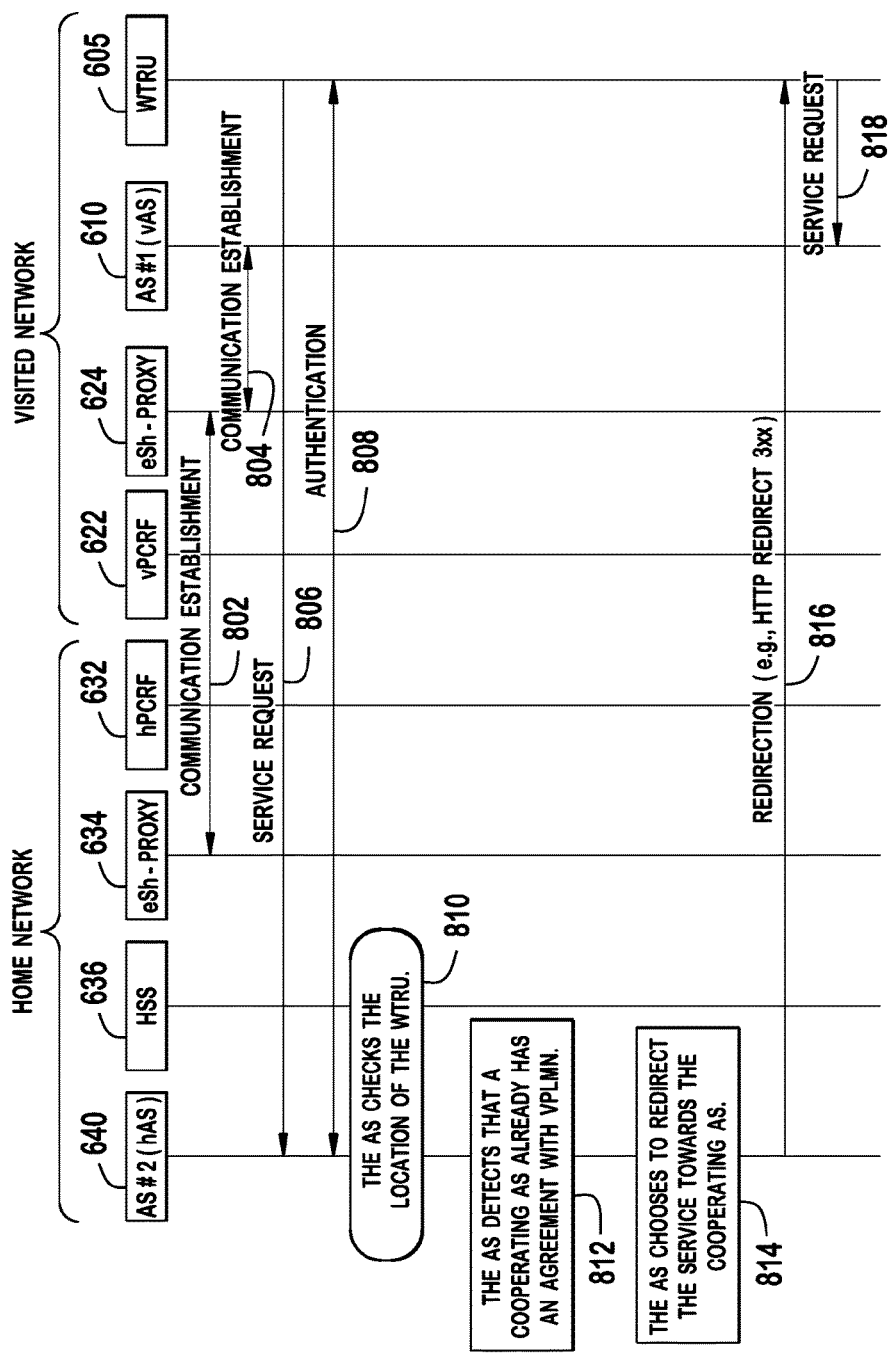
FIG. 8 is a signaling diagram of an example process for redirecting the user from the AS serving the home network to the AS serving the visited network.

FIG. 8 is a signaling diagram of an example process for redirecting the user from the AS serving the home network to the AS serving the visited network. Communication is established between the Sh-proxies 624, 634 of the VPLMN 620 and the HPLMN 630 (802). Communication is also established between the eSh-proxy 624 in the VPLMN 620 and the AS 610 (804). The eSh-proxy-to-eSh-proxy and eSh-proxy-to-AS communication may be pre-established, or alternatively may be established on-demand.

A WTRU 605 sends a service request to the AS 640 in the HPLMN 630 (806). An authentication procedure is performed between the WTRU 605 and the AS 640, which involves other nodes (808). The AS 640 may obtain the WTRU location using Rx (according to one of the embodiments disclosed above) or eSh (using a location request), and learns that the WTRU 605 is visiting the VPLMN 620 (810). The AS 640 detects using its internal state or configuration that a cooperating AS 610 provides the same service to the VPLMN users (812). In one embodiment, the AS 640 may continue delivering the service without redirecting the WTRU 605 to the AS 610. Alternatively, the AS 640 may choose to redirect the WTRU 605 towards the cooperating AS 610 (814). The AS 640 sends a redirection request (e.g., HTTP Redirect) to the WTRU 605 (816). The WTRU 605 then sends a service request to the AS 610 serving the VPLMN 620 (818).

Figure 9:
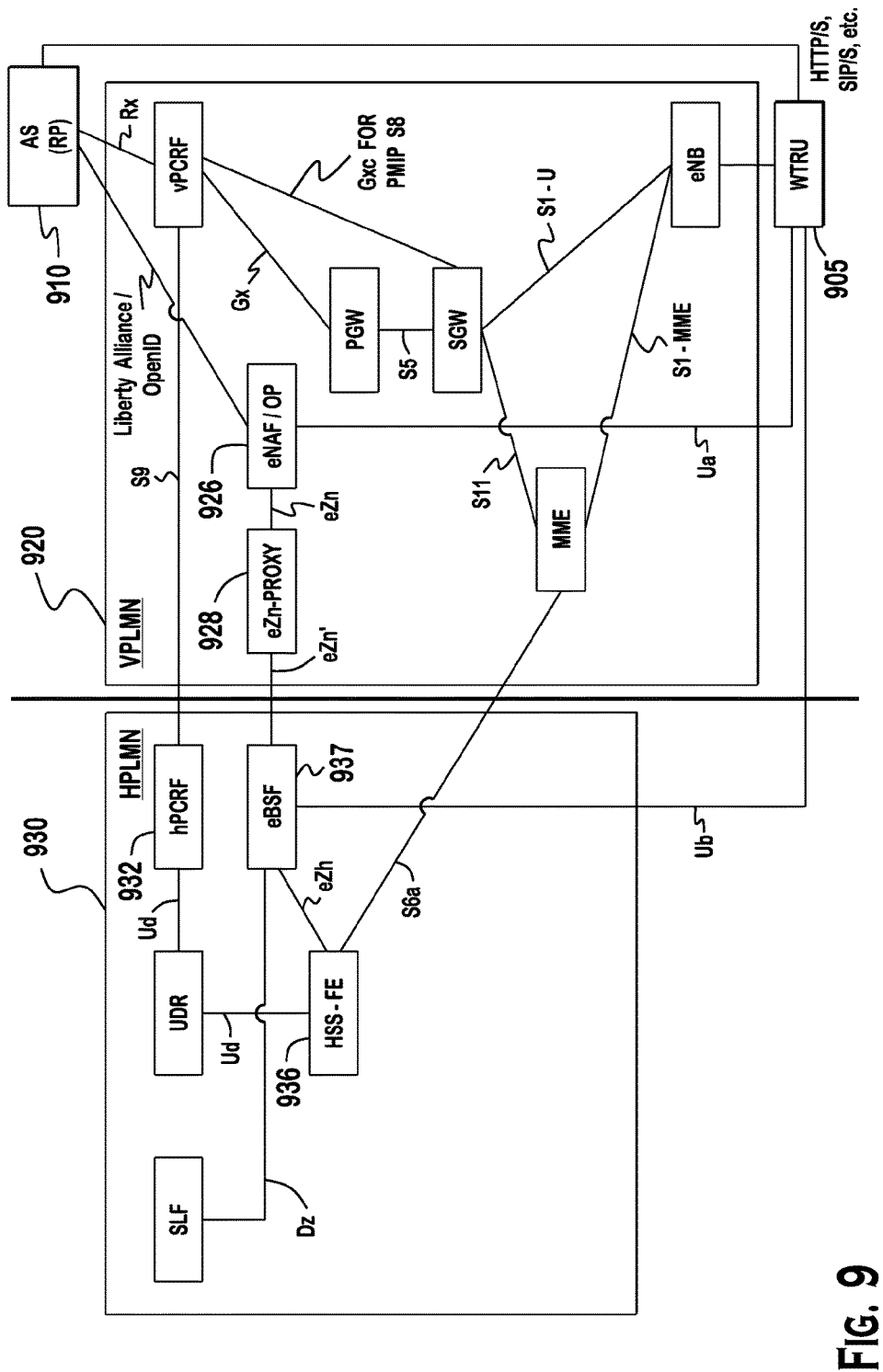
FIG. 9 shows an example network architecture wherein the NAF functionality is co-located with the OpenID provider (OP) and AS-VPLMN interconnection and an eZn-proxy are used for policing, charging, and obtaining user data.

FIG. 9 shows an example network architecture wherein the NAF functionality is co-located with the OP and AS-VPLMN interconnection and an eZn-proxy are used for policing, charging, and obtaining user data. The AS 910 may be under the control of the application provider. Alternatively, the AS 910 may be under the control of the VPLMN network operator.

The NAF functionality is co-located with the OP to combine the Generic Bootstrapping architecture (GBA) and the OpenID architecture. The NAF functionality may be added to the OpenID server. OpenID is a standard that describes how users can be authenticated in a decentralized manner. Users may create accounts with an OP, and then use those accounts as a basis for signing on to any website which accepts OpenID authentication. The OpenID standard provides a framework for the communication that may take place between the OP and the OpenID acceptor (the "relying party" (RP)). An end-user is the entity that wants to assert a particular identity. An RP is a web site or application that wants to verify the end-user's identifier. The OP provides the OpenID authentication. OpenID enables an end-user to communicate with an RP. This communication is done through the exchange of an identifier (i.e., OpenID).

Referring to FIG. 9, the enhanced NAF/OP (eNAF/OP) 926 is located in the VPLMN 920 and the eNAF 926 communicates with the eBSF 937 in the HPLMN 930 via an eZn-proxy function 928. Alternatively, the eNAF/OP 926 and the eZn-proxy 928 may be located in a different network than the VPLMN 920. The application provider has an agreement with the VPLMN operator. The AS 910 acting as an RP may interconnect with the eNAF 926 acting as an OP server in the VPLMN 920 using Single Sign-On (SSO) protocol (e.g., OpenID, Liberty Alliance, etc.).

The GBA is limited to universal integrated circuit card (UICC)-based credentials. In one embodiment, GBA entities (e.g., BSF, Zn-Proxy, and NAF) and reference points (e.g., Ua, Ub, Zn, Zn', and Zh) may be enhanced to enable non-UICC based credentials (e.g., SIP Digest, passwords, etc.), and automated authentication methods negotiation and selection. The Zn reference point may be enhanced (i.e., eZn) to enable retrieving user specific data normally available over eSh in addition to the application-specific user security setting (USS). The eZn' reference point is distinguished from the Zn reference point in that it is used between operators. The Zh reference point may be enhanced (i.e., eZh) to enable retrieving user specific data normally available over eSh from the HSS in addition to the authentication vectors (AVs), GBA User Security Settings (GUSS), and USS. GUSS contains the BSF specific information element and the set of all application-specific USSs. Attributes exchange over the Liberty Alliance/OpenID reference point may be enhanced to carry the information available over eSh interface.

Figure 10:
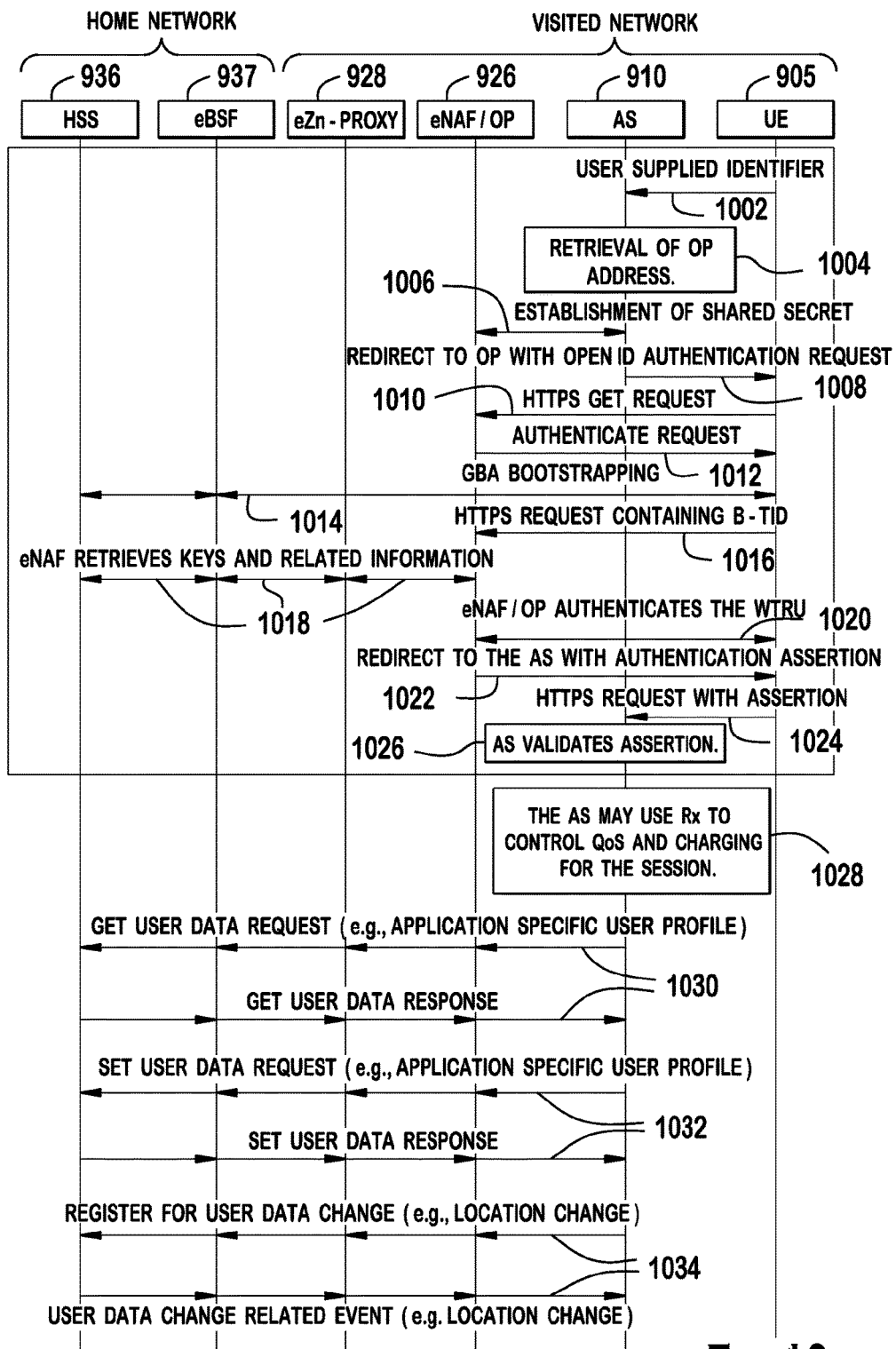
FIG. 10 is a signaling diagram of an example process for establishing an application session and using AS-VPLMN interconnection and an eZn-proxy for policing, charging, and obtaining user data in accordance with one embodiment.

FIG. 10 is a signaling diagram of an example process for establishing an application session and using AS-VPLMN interconnection and an eZn-proxy for policing, charging, and obtaining user data in accordance with one embodiment. The WTRU 905 sends a User-Supplied Identifier to the AS 910 working as an RP (1002). The AS 910 retrieves the address of the OP and performs a discovery of the OP Endpoint URL (based on the User-Supplied Identifier) that the end user wishes to use for authentication (1004).

The AS 910 and the eNAF/OP 926 may establish a shared secret, for example, using the Diffie-Hellman key exchange protocol (1006). The purpose of this shared secret is that the eNAF/OP 926 may sign subsequent messages and the AS 910 may verify those messages.

The AS 910 redirects the WTRU 905 to the eNAF/OP 926 with an OpenID authentication request (1008). The WTRU 905 sends an HTTPS GET request to the eNAF/OP 926 (1010). The eNAF/OP 926 initiates the WTRU authentication and responds with an HTTPS response code 401 "Unauthorized", which contains a WWW Authenticate header carrying a challenge requesting the WTRU to use Digest Authentication with GBA with server side certificates (1012).

If no valid Ks is available, the WTRU 905 may bootstrap with the eBSF 937 to obtain a valid Ks (1014). From this the WTRU 905 may derive the application specific NAF key(s). The WTRU 905 sends an HTTPS GET request to the eNAF/OP 926 (1016). The HTTPS GET request carries an authorization header containing the B-TID received from the eBSF 937.

Using the B-TID and NAF_ID, the eNAF/OP 926 may retrieve the shared application specific NAF key and the USS from the eBSF 937 (1018). The eNAF/OP 926 may store the B-TID, the cryptographic keys and the user supplied identifier to allow matching of the OpenID user session and the GBA session.

The eNAF/OP 926 authenticates the user for OpenID (1020). The eNAF/OP 926 redirects the WTRU 905 back to the AS 910 with either an assertion that authentication is approved or a message that authentication failed (1022). The WTRU 905 sends an HTTPS request with assertion (1024). The AS 910 validates the assertion (i.e., checks if the authentication was approved) (1026). If the validation of the assertion is successful, the user is logged in to the service of the AS 910.

Once the WTRU 905 is authenticated using GBA/OpenID, the AS 910 may control QoS or other policy and charging for the session using Rx (1028). The AS 910 may access user data in the HSS 936 (e.g., application-specific user profile) through the eNAF 926, the eZn-proxy 928, and the eBSF 937 (1030). The AS 910 may also set information (e.g., application-specific user profile) in the HSS 936 through the eNAF 926, the eZn-proxy 928, and the eBSF 937 (1032). The AS 910 may register events (e.g., location change) in the HSS through the eNAF 926, the eZn-proxy 928, and the eBSF 937 (1034).

Figure 11:
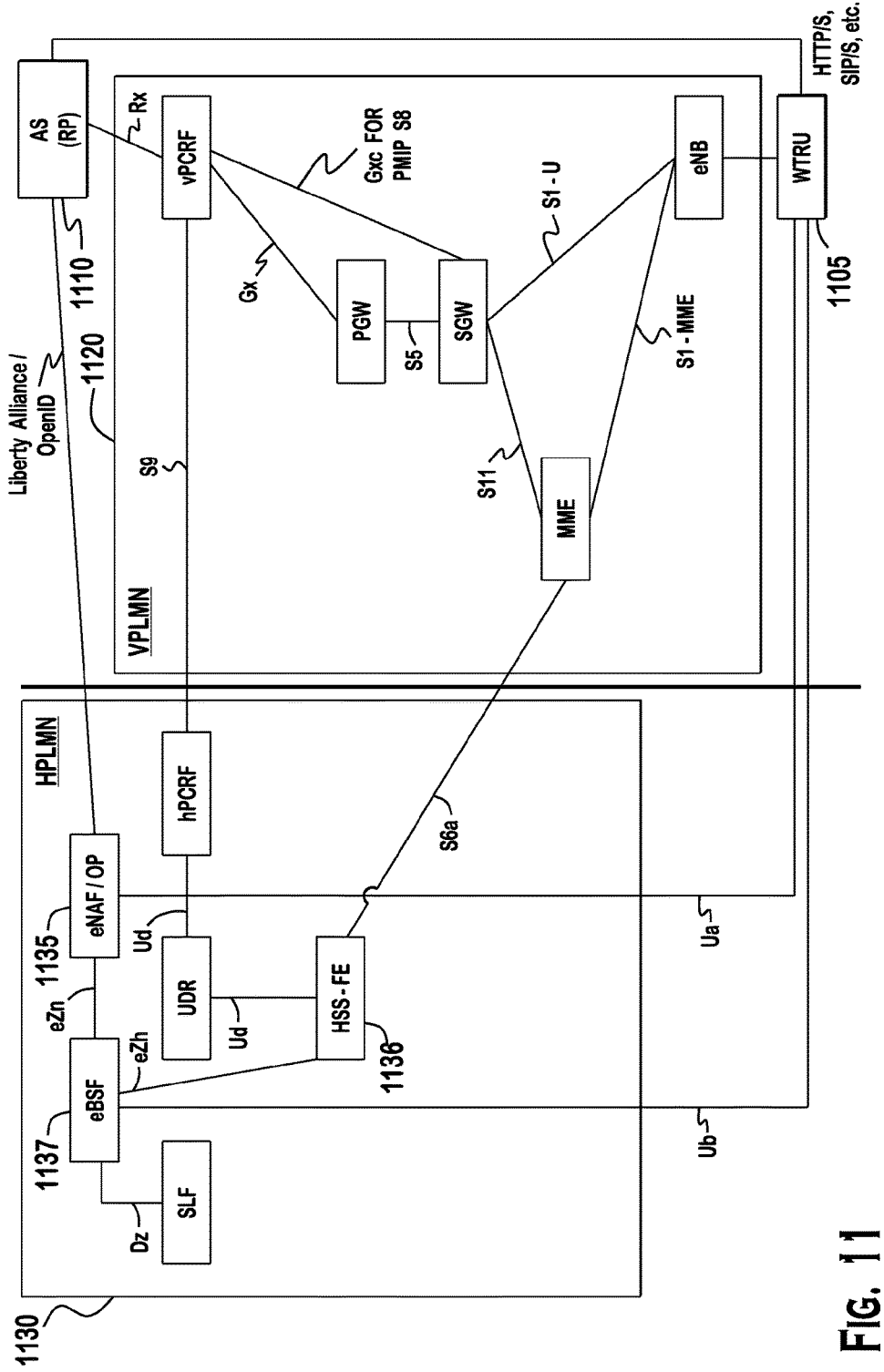
FIG. 11 shows an example network architecture wherein the NAF functionality is co-located with the OP and AS-VPLMN interconnection and an enhanced network application function (eNAF) in the HPLMN are used for policing, charging, and obtaining user data.

FIG. 11 shows an example network architecture wherein the eNAF functionality is co-located with the OP and AS-VPLMN interconnection and an eNAF in the HPLMN are used for policing, charging, and obtaining user data. The application provider has an agreement with the VPLMN operator. It is similar to FIG. 9, and a difference is that an eNAF/OP 1137 is located in the HPLMN 1130. The AS 1110 acting as an RP may interconnect with the eNAF/OP 1165 in the HPLMN 1130 using SSO protocol (e.g., OpenID, Liberty Alliance, etc.). The eNAF/OP 1135 communicates with an eBSF 1137 in the HPLMN 1130 over the eZn reference point. The AS 1110 may be under the control of the application provider. Alternatively, the AS 1110 may be under the control of the VPLMN network operator.

The GBA is limited to UICC-based credentials. GBA entities (e.g., BSF and NAF) and reference points (e.g., Ua, Ub, Zn, and Zh) may be enhanced to enable non-UICC based credentials (e.g., SIP Digest, passwords, etc.), and automated authentication methods negotiation and selection. The Zn reference point may be enhanced (i.e., eZn) to enable retrieving user specific data normally available over eSh in addition to the application-specific USS. The Zh reference point may be enhanced (i.e., eZh) to enable retrieving user specific data normally available over eSh from the HSS in addition to the AVs, GUSS, and USS. Attributes exchange over the Liberty Alliance/OpenID reference point may be enhanced to carry the information available over eSh interface.

Figure 12:
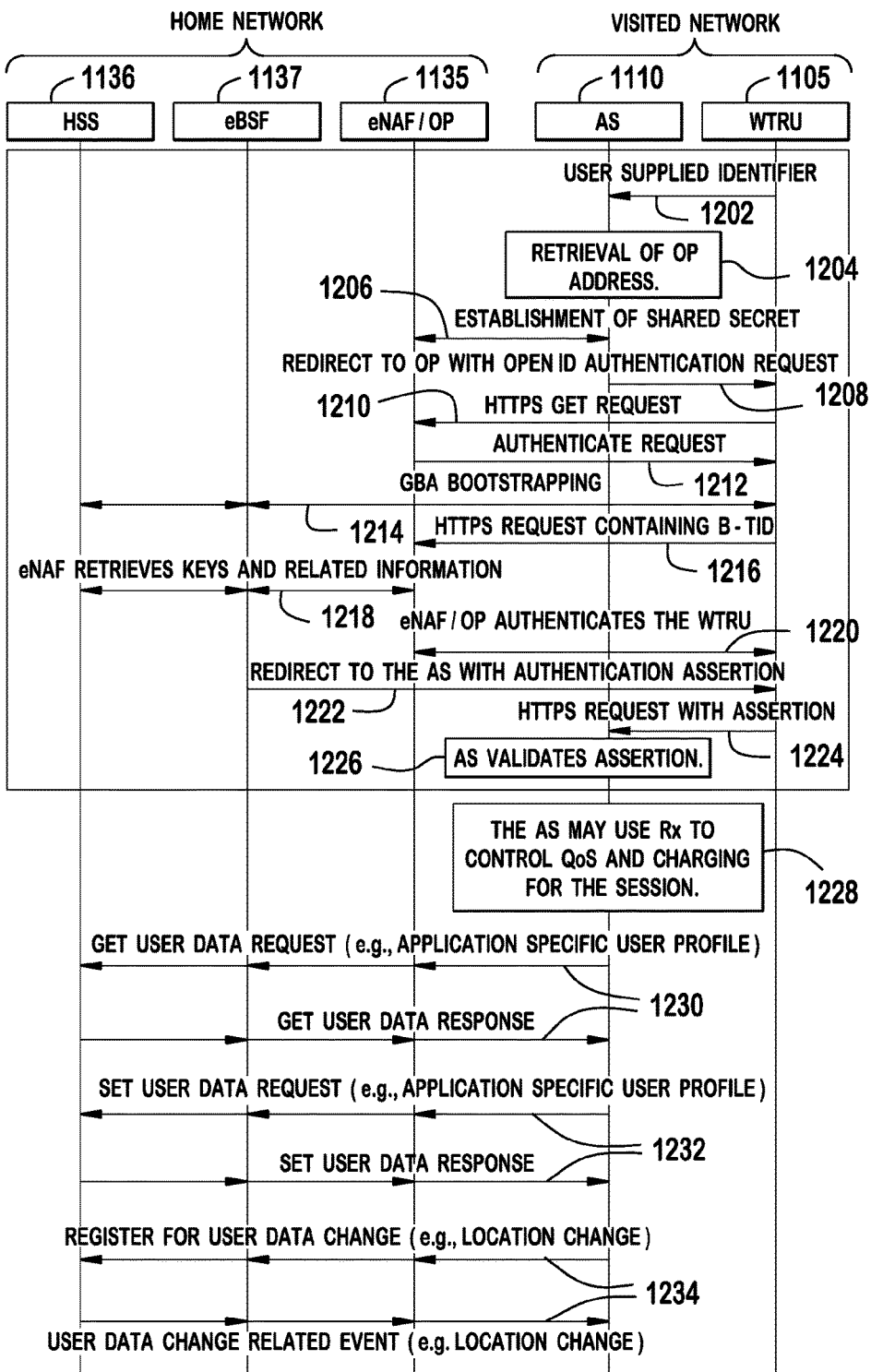
FIG. 12 is a signaling diagram of an example process for establishing an application session in accordance with one embodiment.

FIG. 12 is a signaling diagram of an example process for establishing an application session in accordance with one embodiment. The WTRU 1105 sends a User-Supplied Identifier to the AS 1110 working as a relying party (1202). The AS may authenticate the WTRU using OpenID. The AS 1110 retrieves the address of the eNAF/OP 1135 and performs a discovery of the OP Endpoint URL (based on the User-Supplied Identifier) that the end user wishes to use for authentication (1204).

The AS 1110 and the eNAF/OP 1135 in the HPLMN 1130 may establish a shared secret, for example, using the Diffie-Hellman key exchange protocol (1206). The purpose of this shared secret is that the eNAF/OP 1135 may sign subsequent messages and the AS 1110 may verify those messages.

The AS 1110 redirects the WTRU 1105 to the eNAF/OP 1135 with an OpenID authentication request (1208). The WTRU 1105 sends an HTTPS GET request to the eNAF/OP 1135 in the HPLMN 1130 (1210). The eNAF/OP 1135 initiates the WTRU authentication and responds with an HTTPS response code 401 "Unauthorized", which contains a WWW Authenticate header carrying a challenge requesting the WTRU to use Digest Authentication with GBA with server side certificates (1212).

If no valid Ks is available, the WTRU 1105 may bootstrap with the eBSF 1137 to obtain a valid Ks (1214). From this the WTRU 1105 may derive the application specific NAF key(s). The WTRU 1105 sends an HTTPS GET request to the eNAF/OP 1135 (1216). The HTTPS GET request carries an authorization header containing the B-TID received from the eBSF 1137.

Using the B-TID and NAF_ID, the eNAF/OP 1135 retrieves the shared application specific NAF key and the USS from the eBSF 1137 (1218). The eNAF/OP 1135 may store the B-TID, the cryptographic keys and the user supplied identifier to allow matching of the OpenID user session and the GBA session.

The eNAF/OP 1135 authenticates the user for OpenID (1220). The eNAF/OP 1135 redirects the WTRU 1105 back to the AS 1110 with either an assertion that authentication is approved or a message that authentication failed (1222). The WTRU 1105 sends an HTTPS request with assertion (1224). The AS 1110 validates the assertion (i.e., checks if the authentication was approved) (1226). If the validation of the assertion is successful, the user is logged in to the service of the AS 1110.

Once the WTRU 1105 is authenticated using GBA/OpenID, the AS 1110 may control QoS and charging for the session using Rx (1228). The AS 1110 may access user data in the HSS 1136 (e.g., application-specific user profile) through the eNAF 1135, and the eBSF 1137 (1230). The AS 1110 may also set information in the HSS 1136 (e.g., application-specific user profile) through the eNAF 1135, and the eBSF 1137 (1232). The AS 1110 may register events in the HSS 1136 (e.g., location change) through the eNAF 1135, and the eBSF 1137 (1234).

Figure 13:
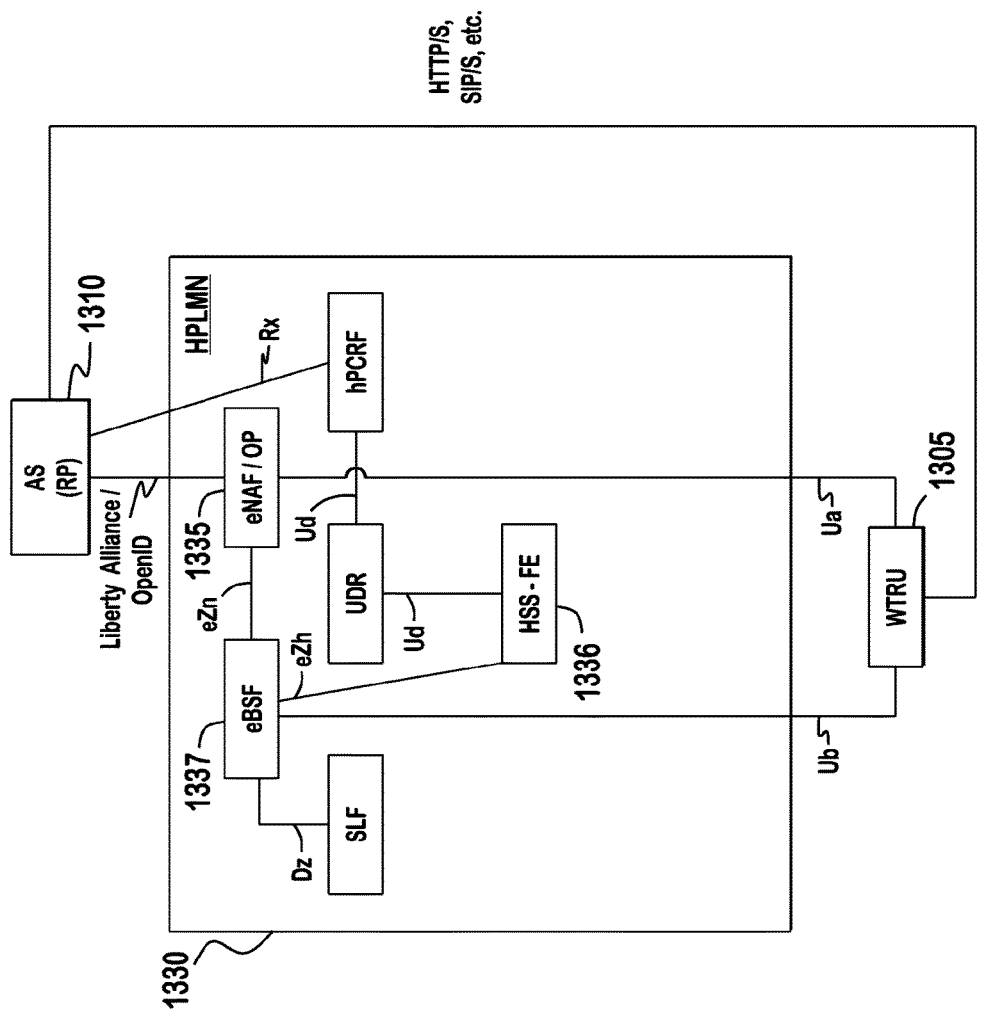
FIG. 13 shows an example network architecture with an eNAF/OP in the HPLMN in a non-roaming case.

FIG. 13 shows an example network architecture with an eNAF/OP in the HPLMN in a non-roaming case. The mechanism enabled by eNAF/OP may be used in a non-roaming context. In this embodiment, the application provider has an agreement with the HPLMN operator. An eNAF/OP 1335 may be located in the HPLMN 1330. The AS 1310 acting as an RP may interconnect with the eNAF/OP 1335 in the HPLMN 1330 using SSO protocol (e.g., OpenID, Liberty Alliance, etc.). The eNAF/OP 1335 communicates with an eBSF 1337 in the HPLMN 1330 over the eZn reference point. Alternatively, the eNAF/OP 1335 may be located in other network than the HPLMN 1330. In this case, the eNAF/OP 1335 may use a Zn-proxy (that may be co-located with the eNAF/OP 1335) to communicate with the eBSF 1337 in the HPLMN 1330. The embodiments disclosed herein are applicable to both cases. The AS 1310 may be under the control of the application provider. Alternatively, the AS 1310 may be under the control of the VPLMN network operator.

The GBA is limited to UICC-based credentials. GBA entities (e.g., BSF and NAF) and reference points (e.g., Ua, Ub, Zn, and Zh) may be enhanced to enable non-UICC based credentials (e.g., SIP Digest, passwords, etc.), and automated authentication methods negotiation and selection. The Zn reference point may be enhanced (i.e., eZn) to enable retrieving user specific data normally available over eSh in addition to the application-specific USS. The Zh reference point may be enhanced (i.e., eZh) to enable retrieving user specific data normally available over eSh from the HSS in addition to the AVs, GUSS, and USS. Attributes exchange over the Liberty Alliance/OpenID reference point may be enhanced to carry the information available over eSh interface.

Figure 14:
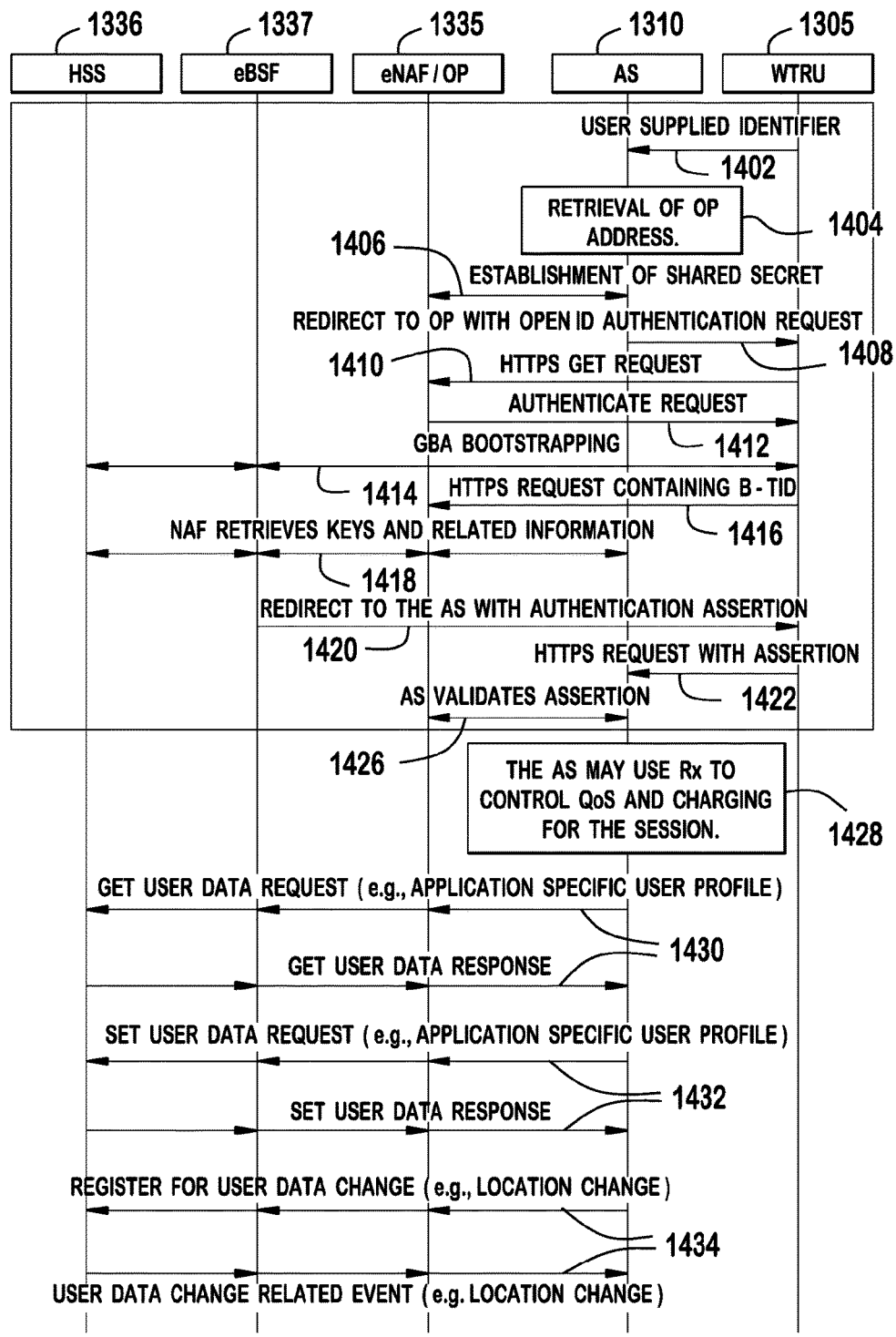
FIG. 14 is a signaling diagram of an example process for establishing an application session using an eNAF in the HPLMN in a non-roaming case in accordance with one embodiment.

FIG. 14 is a signaling diagram of an example process for establishing an application session using an eNAF in the HPLMN in a non-roaming case in accordance with one embodiment. The WTRU 1305 sends a User-Supplied Identifier to the AS 1310 working as an RP (1402). The AS may authenticate the WTRU using OpenID. The AS 1310 retrieves the address of the OP and performs a discovery of the OP Endpoint URL (based on the User-Supplied Identifier) that the end user wishes to use for authentication (1404).

The AS 1310 and the eNAF/OP 1335 in the HPLMN 1330 may establish a shared secret, for example, using the Diffie-Hellman key exchange protocol (1406). The purpose of this shared secret is that the eNAF/OP 1335 may sign subsequent messages and the AS 1310 may verify those messages.

The AS 1310 redirects the WTRU 1305 to the eNAF/OP 1335 with an OpenID authentication request (1408). The WTRU 1305 sends an HTTPS GET request to the eNAF/OP 1335 (1410). The eNAF/OP 1335 initiates the WTRU authentication and responds with an HTTPS response code 401 "Unauthorized", which contains a WWW Authenticate header carrying a challenge requesting the WTRU to use Digest Authentication with GBA with server side certificates (1412).

If no valid Ks is available, the WTRU 1305 may bootstrap with the eBSF 1337 to obtain a valid Ks (1414). From this the WTRU 1305 may derive the application specific NAF key(s). The WTRU 1305 sends an HTTPS GET request to the eNAF/OP 1335 (1416). The HTTPS GET request carries an authorization header containing the B-TID received from the eBSF 1337.

Using the B-TID and NAF_ID, the eNAF/OP 1335 retrieves the shared application specific NAF key and the USS from the eBSF 1337 (1418). The eNAF/OP 1335 may store the B-TID, the cryptographic keys and the user supplied identifier to allow matching of the OpenID user session and the GBA session.

The eNAF/OP 1335 authenticates the user for OpenID (1420). The eNAF/OP 1335 redirects the WTRU 1305 back to the AS 1310 with either an assertion that authentication is approved or a message that authentication failed (1422). The WTRU 1305 sends an HTTPS request with assertion (1424). The AS 1310 validates the assertion (i.e., checks if the authentication was approved) (1426). If the validation of the assertion is successful, the user is logged in to the service of the AS 1310.

Once the WTRU 1305 is authenticated using GBA/OpenID, the AS 1310 may control QoS and charging for the session using Rx (1428). The AS 1310 may access user data in the HSS (e.g., application-specific user profile) through the eNAF 1335, and the eBSF 1337 (1430). The AS 1310 may also set information in the HSS (e.g., application-specific user profile) through the eNAF 1335, and the eBSF 1337 (1432). The AS 1310 may register events in the HSS (e.g., location change) through the eNAF 1335, and the eBSF 1337 (1434).

Figure 15:
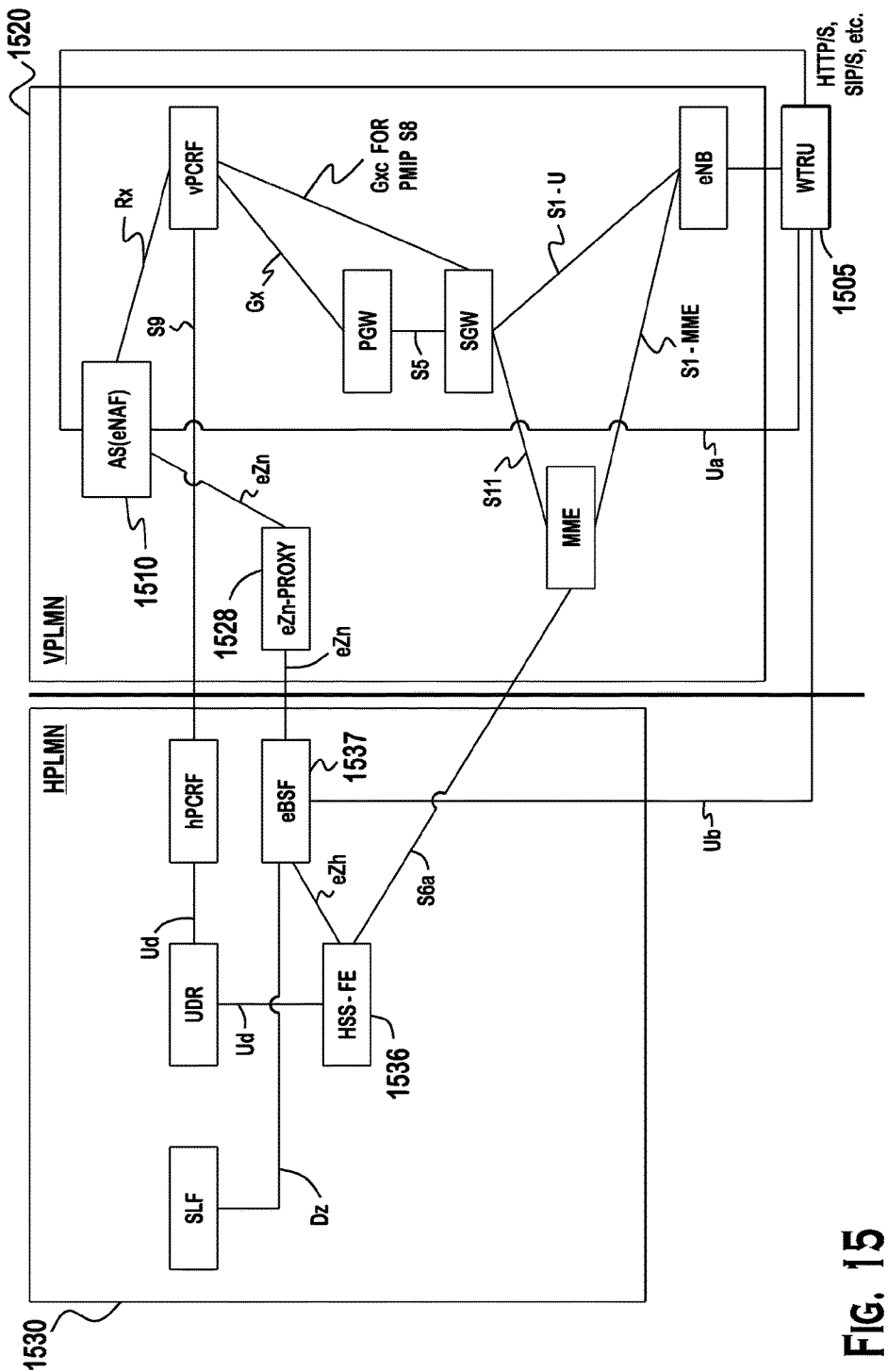
FIG. 15 shows an example network architecture with the co-located AS/eNAF.

In another embodiment, the AS and the eNAF may be co-located. FIG. 15 shows an example network architecture with the co-located AS/eNAF. The application provider has an agreement with the VPLMN operator. The AS 1510 hosted by the VPLMN 1520 acts as an eNAF and communicates with an eBSF 1537 in the HPLMN 1530 via an eZn-proxy function 1528.

The GBA is limited to UICC-based credentials. GBA entities (e.g., BSF and NAF) and reference points (e.g., Ua, Ub, Zn, and Zh) may be enhanced to enable non-UICC based credentials (e.g., SIP Digest, passwords, etc.), and automated authentication methods negotiation and selection. The Zn reference point may be enhanced (i.e., eZn) to enable retrieving user specific data normally available over eSh in addition to the application-specific USS. The Zh reference point may be enhanced (i.e., eZh) to enable retrieving user specific data normally available over eSh from the HSS in addition to the AVs, GUSS, and USS. Attributes exchange over the Liberty Alliance/OpenID reference point may be enhanced to carry the information available over eSh interface.

Figure 16:
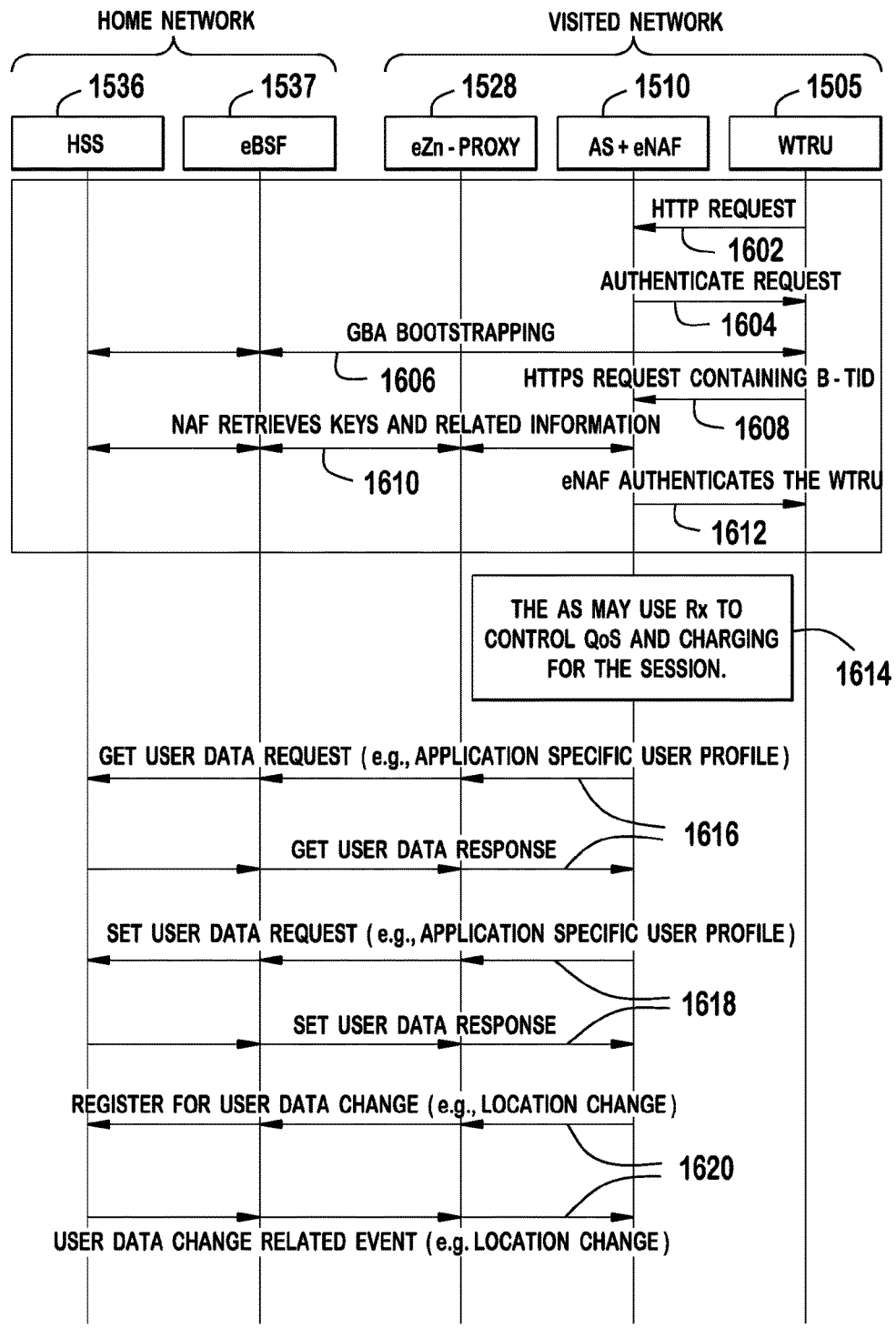
FIG. 16 is a signaling diagram of an example process for establishing an application session where the AS and the eNAF are co-located in accordance with one embodiment.
Figure 17:
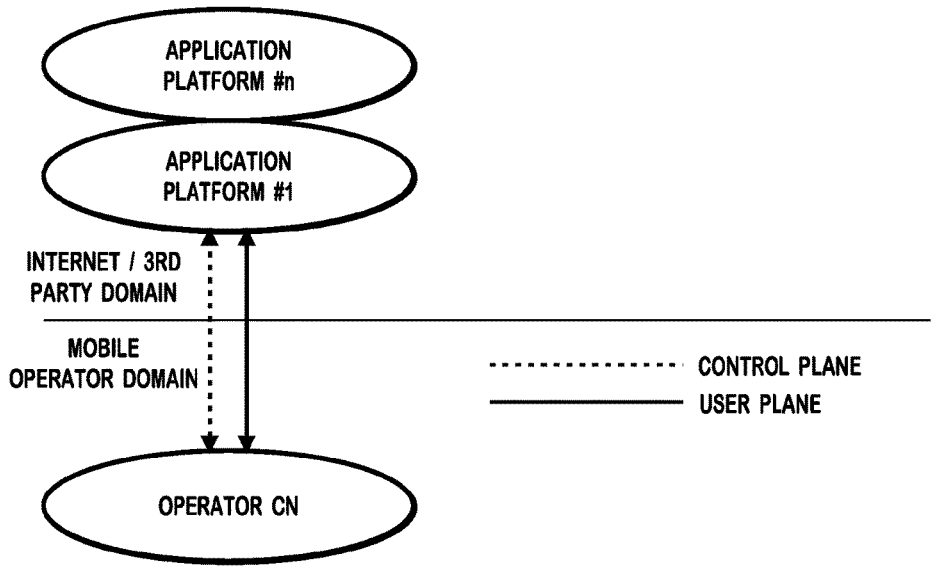
FIG. 17 shows the non-roaming case where the application platform is connected to the mobile network operator core network.
Figure 18:
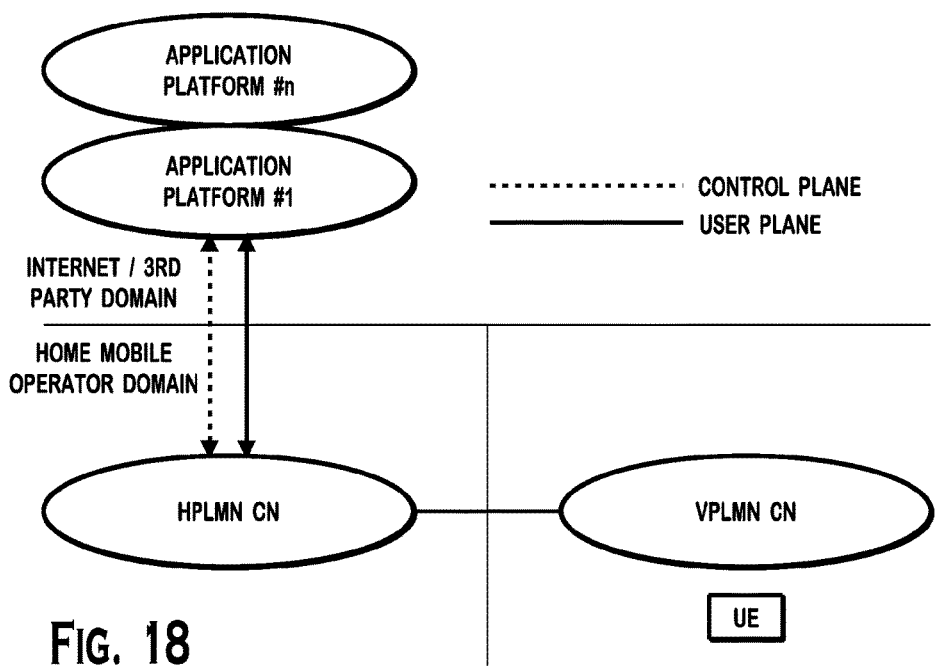
FIG. 18 shows the roaming case where a WTRU is roaming a VPLMN and accessing the application provided by the HPLMN.

FIG. 16 is a signaling diagram of an example process for establishing an application session where the AS and the eNAF are co-located in accordance with one embodiment. The WTRU 1605 sends an HTTPS GET request to the AS/eNAF 1510 (1602). The AS/eNAF 1510 initiates the WTRU authentication and responds with an authentication request (1604). The WTRU 1505 may perform the bootstrapping procedure with the eBSF 1537 to obtain a valid Ks (1606).

The WTRU 1505 sends an HTTPS GET request to the AS/eNAF 1510 (1608). The HTTPS GET request carries an authorization header containing the B-TID received from the eBSF 1537. Using the B-TID and NAF_ID, the AS/eNAF 1510 retrieves the shared application specific NAF key and the US S from the eBSF 1537 (1610). The eNAF/AS 1510 authenticates the user and the AS-WTRU communication may proceed (1612).

Once the WTRU 1505 is authenticated using GBA/OpenID, the AS/eNAF 1510 may control QoS and charging for the session using Rx (1614). The AS/eNAF 1510 may access user data in the HSS (e.g., application-specific user profile) through the eZn-proxy 1528, and the eBSF 1537 (1616). The AS/eNAF 1510 may also set information in the HSS (e.g., application-specific user profile) through the eZn-proxy 1528, and the eBSF 1537 (1618). The AS/eNAF 1510 may register events in the HSS (e.g., location change) through the eZn-proxy 1528, and the eBSF 1537 (1620).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
   an application server receiving a request for service from a wireless transmit/receive unit (WTRU) that is associated with a home network, wherein the home network comprises both a home subscriber server (HSS) and a bootstrapping server function (BSF), wherein the HSS and the BSF are communicatively coupled with one another via a Zh-type reference point;
   the application server authenticating the WTRU at least in part by:
      redirecting the WTRU to an identity provider (IDP) that is co-located with a network application function (NAF) (IDP/NAF), wherein the IDP/NAF and the BSF are communicatively coupled with one another via a Zn-type reference point; and
      receiving an assertion from the WTRU that the IDP/NAF has authenticated the WTRU, wherein the assertion is based on user security settings retrieved from the BSF by the IDP/NAF over the Zn-type reference point; and
   subsequent to authenticating the WTRU, the application server:
      retrieving user-specific Sh-reference-point-type data from the HSS via the IDP/NAF over (i) the Zn-type reference point between the IDP/NAF and the BSF and (ii) the Zh-type reference point between the BSF and the HSS; and providing the requested service to the WTRU based on the retrieved user-specific Sh-reference-point-type data.

2. The method of claim 1, wherein the identity provider is OpenID.

3. The method of claim 1, wherein the identity provider is Liberty Alliance.

4. The method of claim 1, wherein the IDP/NAF is located in the home network.

5. The method of claim 1, wherein the IDP/NAF is not located in the home network.

6. The method of claim 1, wherein:
the application server and the IDP/NAF are communicatively coupled with one another via a Single Sign On (SSO) reference point; and
the application server retrieving the user-specific Sh-reference-point-type data from the HSS via the IDP/NAF is further over the SSO reference point between the application server and the IDP/NAF.

7. The method of claim 1, wherein the Zh-type reference point is selected from the group consisting of a Zh reference point and an enhanced Zh (eZh) reference point.

8. The method of claim 1, wherein the Zn-type reference point is selected from the group consisting of a Zn reference point and an enhanced Zn (eZn) reference point.

9. The method of claim 1, wherein the retrieved user security settings comprise application-specific user security settings.

10. The method of claim 1, wherein the retrieved user-specific Sh-reference-point-type data comprises one or more of user-profile data, user-group-list data, user-service-related data, user-location data, and user-charging data.

11. An application server comprising:
a processor configured to:
receive a request for service from a wireless transmit/receive unit (WTRU) that is associated with a home network, wherein the home network comprises both a home subscriber server (HSS) and a bootstrapping server function (BSF), wherein the HSS and the BSF are communicatively coupled with one another via a Zh-type reference point,
authenticate the WTRU at least in part by:
redirecting the WTRU to an identity provider (IDP) that is co-located with a network application function (NAF) (IDP/NAF), wherein the IDP/NAF and the BSF are communicatively coupled with one another via a Zn-type reference point, and
receiving an assertion from the WTRU that the IDP/NAF has authenticated the WTRU, wherein the assertion is based on user security settings retrieved from the BSF by the IDP/NAF over the Zn-type reference point, and
subsequent to authenticating the WTRU:
retrieve user-specific Sh-reference-point-type data from the HSS via the IDP/NAF over (i) the Zn-type reference point between the IDP/NAF and the BSF and (ii) the Zh-type reference point between the BSF and the HSS; and
provide the requested service to the WTRU based on the retrieved user-specific Sh-reference-point-type data.

12. The application server of claim 11, wherein the identity provider is OpenID.

13. The application server of claim 11, wherein the identity provider is Liberty Alliance.

14. The application server of claim 11, wherein the IDP/NAF is located in the home network.

15. The application server of claim 11, wherein the IDP/NAF is not located in the home network.

16. The application server of claim 11, wherein:
the application server and the IDP/NAF are communicatively coupled with one another via a Single Sign On (SSO) reference point; and
the application server retrieving the user-specific Sh-reference-point-type data from the HSS via the OP/NAF is further over the SSO reference point between the application server and the OP/NAF.

17. The application server of claim 11, wherein the Zh-type reference point is selected from the group consisting of a Zh reference point and an enhanced Zh (eZh) reference point.

18. The application server of claim 11, wherein the Zn-type reference point is selected from the group consisting of a Zn reference point and an enhanced Zn (eZn) reference point.

19. The application server of claim 11, wherein the retrieved user security settings comprise application-specific user security settings.

20. The application server of claim 11, wherein the retrieved user-specific Sh-reference-point-type data comprises one or more of user-profile data, user-group-list data, user-service-related data, user-location data, and user-charging data.

* * * * *